United States Patent [19]

Clements et al.

[11] 3,845,425

[45] Oct. 29, 1974

[54] METHOD AND APPARATUS FOR PROVIDING CONDITIONAL AND UNCONDITIONAL ACCESS TO PROTECTED MEMORY STORAGE LOCATIONS

[75] Inventors: John L. Clements, Naperville; Paul J. Keehn, Glen Ellyn; Leo V. Jones, Jr., Chicago; Paul A. Zelinski, Elmhurst, all of Ill.

[73] Assignee: GTE Automatic Electric Laboratories Incorporated, Northlake, Ill.

[22] Filed: June 15, 1973

[21] Appl. No.: 370,279

[52] U.S. Cl. .............................................. 340/172.5
[51] Int. Cl. .............................................. G06f 13/00
[58] Field of Search .................................. 340/172.5

[56] References Cited

UNITED STATES PATENTS

| | | | |
|---|---|---|---|
| 3,398,405 | 8/1968 | Carlson et al. | 340/172.5 |
| 3,465,297 | 9/1969 | Thomas et al. | 340/172.5 |
| 3,599,159 | 8/1971 | Creech et al. | 340/172.5 |
| R27,239 | 11/1971 | Ulrich | 340/172.5 |

*Primary Examiner*—Raulfe B. Zache

[57] ABSTRACT

A computer memory control arrangement includes a plurality of input/output ports for permitting a central processor connected to one port to access a main memory to obtain/or store data or instructions for enabling the central processor to effect call processing or maintenance operations and for permitting the transfer of other programs to the main memory from a drum control memory including at least one drum control unit connected to a further port. A port select circuit permits port selection on a priority basis when memory requests are received over more than one port simultaneously. In addition, while the memory request for a selected port is being processed, the selection of a second port for a second memory request can be initiated before the end of the memory cycle for the first selected port. Each drum control unit has an assigned block of data storage locations or an initialization table of any computer main memory. The central processor can effect a transfer of instructions from a designated drum control unit to the main memory by accessing the main memory and storing instructions in the initialization table for the designated drum control unit and thereafter sending an instruction to the drum control unit to enable the drum control unit to access its initialization table and effect the transfer indicated therein. Initialization table protection is provided by a circuit which prevents one drum control unit from writing into an initialization table of another drum control unit. A read only memory circuit prevents the drum control units and the central processor from writing into a preselected block of data storage locations of the main memory. In addition, a software protect read only memory circuit prevents the central processor from writing into blocks of data storage locations of the computer main memory while permitting the drum control units to write into such locations.

8 Claims, 25 Drawing Figures

PATENTED OCT 29 1974 3,845,425

SHEET 07 OF 21

METHOD AND APPARATUS FOR PROVIDING CONDITIONAL AND UNCONDITIONAL ACCESS TO PROTECTED MEMORY STORAGE LOCATIONS

BACKGROUND OF THE INVENTION

This invention relates to a communication switching system memory control arrangement, and more particularly to a computer memory control for controlling the transfer of data between a main memory and a central processor and between an auxiliary memory and the main memory and which prevents the central processor from writing into predetermined data storage locations of the main memory.

Description of the Prior Art

Communication switching systems, such as telephone switching systems, have employed data processor units for providing various call processing and maintenance functions and for supplying information concerning such functions to other sub-systems such as register senders, or originating and terminating markers, automatic toll ticketing sub-systems, and the like. The data processing unit includes a central processor or computer, a computer main memory, in which the system control program and call processing programs reside.

To perform the required call processing or maintenance functions, the central processor obtains programmed instructions stored in the main memory, decodes each instruction and performs the operation specified by such instructions. Access of data and instructions stored in the main memory is effected through instructions provided by the central processor over a computer memory control.

Such systems may also include an auxiliary memory in the form of a drum memory system, including a revolving drum and associated drum control units, which provides an extension for the computer main memory for bulk storage, providing mass storage for translation data, diagnostic programs, maintenance programs, etc. To obtain such additional programs, the auxiliary or drum memory system is accessed under the control of the central processor permitting the desired programs to be transferred from the auxiliary memory to the computer main memory for access by the central processor.

Preselected areas of the computer main memory are designated as non-resident areas for receiving programs readout of the drum storage as well as instructions and data provided by the central processor. When a drum control unit has stored a program or series of instructions in a given block of consecutive storage locations in the non-resident area, the situation could arise where the central processor would inadvertently store a data word or instruction in one of the locations which store an instruction of the program. Such writing operation by the central processor would obviously alter an instruction of the program thereby interrupting the continuity of the program previously stored by the drum control unit. Accordingly, when such program were employed by the central processor the series of instructions indicated by such program would be interrupted when the central processor reached the location at which it had subsequently stored a data word or instruction.

Accordingly, it would be desirable to provide a means for protecting locations of programs stored in a main memory by drum control units from being written into by a central processor which has access to the main memory.

SUMMARY OF THE INVENTION

A primary object of the present invention is to provide a new and improved method and apparatus for enabling conditional access of protected memory storage locations by a first subsystem and unconditional access of said protected memory storage locations by a second subsystem.

Another object of this invention is to provide a new and improved communication switching system memory control arrangement for permitting the transfer of data between a central processor and a main memory and between an auxiliary memory and a main memory wherein the central processor is conditionally prevented from writing into predetermined data storage locations of the main memory.

According to the invention, ther is provided a computer memory control for providing memory access control, data transfer control, and memory port selection to permit data transfer between a computer main memory and a central processor or an auxiliary memory, which may be a drum memory system. The computer memory control has a separate input/output port for each drum control unit and a further input/output port for the central processor. The computer memory control is basically a bi-directional multiplex-distributor such that data supplied to any one of the ports can be transferred to any memory bank of the main memory, and data from any memory bank can be transferred to any port on a one transfer at a time basis.

The computer central processor obtains program instructions over its associated port from the computer main memory and decodes the instructions and performs the operation specified by the instructions. When the central processor requires a program or instructions stored on the magnetic drum, the central processor initiates readout of such program by addressing the main memory and storing instructions necessary to effect readout of such program in a preassigned block of storage locations, or initialization table, assigned to such drum control unit. Once the instructions have been stored in the initialization table for the designated drum control unit, the central processor provides an instruction or control pulse directive to the drum control unit enabling the drum control unit to access the main memory over its port of the computer memory control circuit and read out the data stored in its initialization table to provide the readout of the desired program and storage of such program in locations in the main memory as indicated by the instructions stored in its initialization table.

Simultaneous memory requests extended to the input ports of the computer memory control are resolved by a predetermined priority assignment to each port. The ports connected to the drum control units are assigned to the highest priority and the port connected to the central processor is assigned the lowest priority. Service of one memory request is always completed before another is started. The next request to be serviced is always the one of the highest priority in the total requests waiting to be processed.

Once instructions have been stored in the initialization table for a given drum control unit, the transfer of data or program instructions from such drum control unit to the main memory is effected under control of the computer memory control and the central processor is freed to continue call processing or maintenance operations while data is being transferred from the drum control unit to the main memory.

In accordance with a feature of the invention, software protected read only memory provides program protection of individual words written into the main memory. Each data word includes a memory protect bit which is true whenever the word is desired to be protected and the addressed location of the computer main memory which stored such word is to be precluded access by the central processor. On the other hand, if the memory protect bit is falses then such location can be written into by the central processor.

The computer memory control includes means for checking the memory protect bit each time a write operation is indicated for the central processor, and if such memory protect bit is true, the write operation is aborted. In addition, whenever the central processor attempts to write into a protected location in the main memory, an error indication is provided. In the exemplary embodiment, software protected read only memory is provided for the central processor only and the drum control units overwrite software protected read only memory locations.

CROSS-REFERENCE TO RELATED PATENT APPLICATIONS

The preferred embodiment of the invention is incorporated in a COMMUNICATION SWITCHING SYSTEM WITH MARKER, REGISTER, AND OTHER SUBSYSTEMS COORDINATED BY A STORED PROGRAM CENTRAL PROCESSOR, U.S. Pat. application Ser. No. 130,133 filed Apr. 1, 1971 by K. E. Prescher, R. E. Schauer and F. B. Sikorski which is now abandoned, and a continuation-in-part thereof Ser. No. 342,323, filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. Pat. application Ser. No. 139,480 filed May 3, 1971 now U.S. Pat. No. 3,729,715 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. Pat. application Ser. No. 201,851 filed Nov. 24, 1971 now U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. Pat. applications having the same disclosure filed July 12, 1972, Ser. No. 270,909 now U.S. Pat. No. 3,784,801 by J. P. Caputo and F. A. Weber for a DATA HANDLING SYSTEM ERROR AND FAULT DETECTING AND DISCRIMINATING MAINTENANCE ARRANGEMENT, Ser. No. 270,910 now U.S. Pat. No. 3,783,255 by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912 now U.S. Pat. No. 3,805,038 by C. K. Buedel and J. P. Caputo for a DATA HANDLING SYSTEM MAINTENANCE ARRANGEMENT FOR PROCESSING SYSTEM FAULT CONDITIONS, and Ser. No. 270,916 now U.S. Pat. No. 3,783,256 by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. Pat. application Ser. No. 281,586 filed Aug 17, 1972 now U.S. Pat. No. 3,806,659 by J. W. Eddy for an INTERLOCK ARRANGEMENT FOR A COMMUNICATION SWITCHING SYSTEM, Ser. No. 311,606 filed Dec. 4, 1972 by J. W. Eddy and S. E. Puccini for a COMMUNICATION SYSTEM CONTROL TRANSFER ARRANGEMENT, Ser. No. 303,157 filed Nov. 2, 1972 by J. W. Eddy and S. E. Puccini for a COMMUNICATION SWITCHING SYSTEM INTERLOCK ARRANGEMENT, hereinafter referred to as the MARKER patents an applications.

The communication register and the marker transceivers are described in U.S. Pat. application Ser. No. 320,412 filed Jan. 2, 1973 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATION REGISTER patent application.

The executive program for the data processor unit is disclosed in U.S. Pat. application Ser. No. 347,281, filed Apr. 2, 1973 by Kalat et al., for STORED PROGRAM CONTROL IN A COMMUNICATION SWITCHING SYSTEM, hereinafter referred to as the EXECUTIVE PROGRAM patent application.

The computer third party circuit is disclosed in United States patent application Ser. No. 348,575, filed Apr. 6, 1973 for a "DATA PROCESSOR SYSTEM DIAGNOSTIC ARRANGEMENT" by L. V. Jones et al., hereinafter referred to as the THIRD PARTY patent application. The data processor system localization program is disclosed in U.S. Pat. application Ser. No. 348,541, filed Apr. 6, 1973 for a "METHOD OF LOCALIZING THE CAUSES OF MALFUNCTIONS OCCURRING IN A DATA PROCESSOR SYSTEM" by P. J. Keehn, R. C. Wegnet, D. C. Robbins, D. Chang, W. K. Yuan and J. L. Clements, hereinafter referred to as the COMPUTER LOCALIZATION PROGRAM patent application.

The above system, register-sender, marker, communication register, executive program, third party and computer localization program patents and applications are incorporated herein and made a part hereof as though fully set forth.

DESCRIPTION OF THE DRAWINGS

FIGS. 13–16 are to be arranged; and

DESCRIPTION OF THE PREFERRED EMBODIMENT

Figure 1:
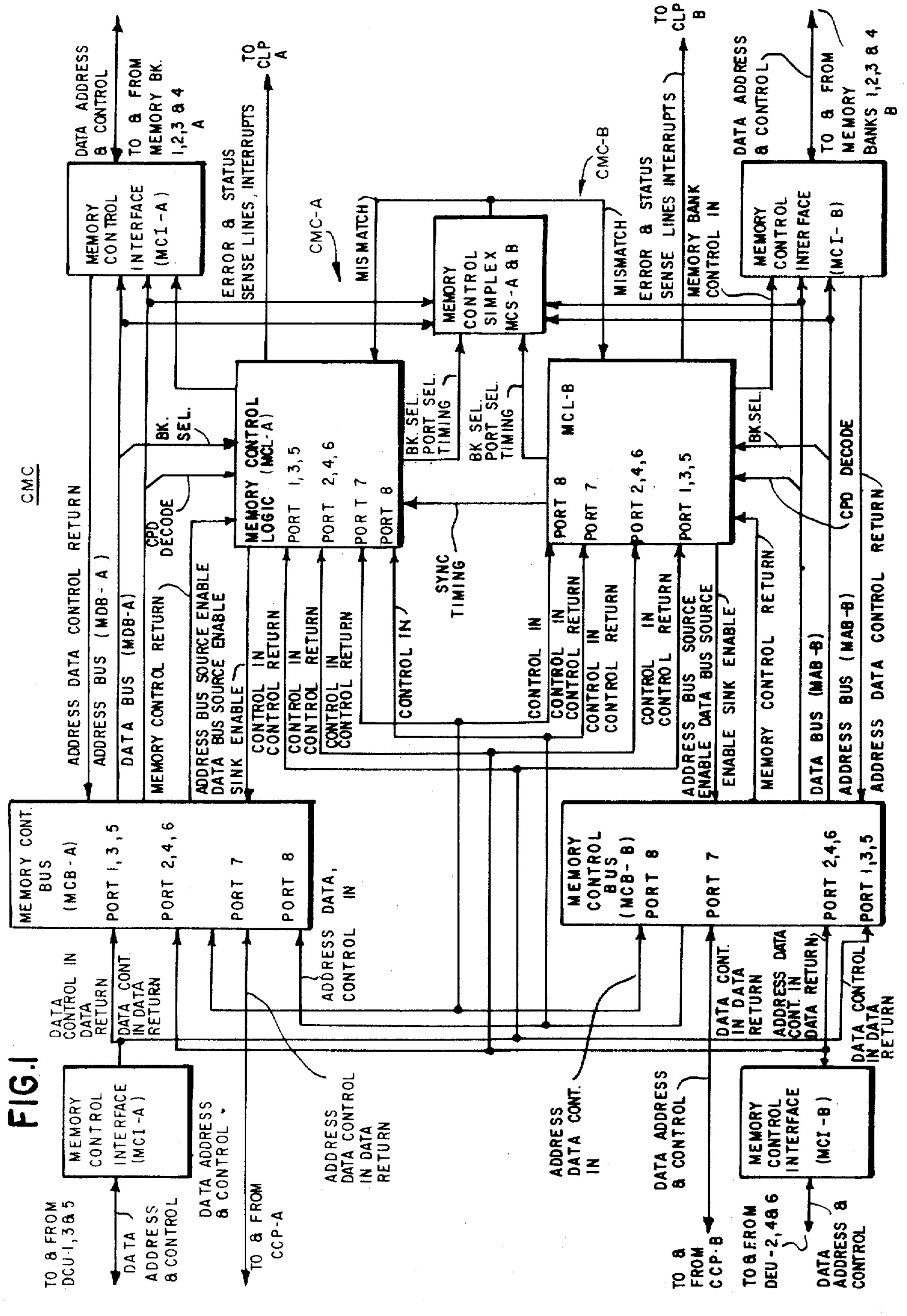
FIG. 1 is a full duplex block diagram of the computer memory control of the present invention.

The computer memory control arrangement of the present invention is illustrated in FIG. 1 of the drawings. The computer memory control arrangement includes duplex memory control CMC-A, CMC-B which include memory control logic MCL-A and MCL-B, respectively, which provide access to computer memory main memory having memory banks CMM(1–4)A and CMM(1–4)B (not shown) for duplex central processors CCP-A and CCP-B (not shown) and a plurality of drum control units DCU (1–6) (not shown). The computer memory controls MCL-A and MCL-B each have eight input/output ports. Drum control units DCU-1, DCU-3 and DCU-5 are connected over memory control interface MCI-A to ports 1, 3 and 5 of the memory control logic MCL-A and to ports 1, 3 and 5 of memory control logic MCL-B. The drum control units 1, 3 and 5 are also extended over memory control interface MCI-A and memory control bus MCB-A to an address MAB-A bus and data bus MDB-A which extends to the memory control logic MCL-A and the memory control interface MCI-A. The central processor CCP-A is connected over a data, address and control bus to port 7 of memory control logic MCL-A and via memory control bus MCB-A to port 8 of memory control logic MCL-B.

Drum control units DCU-2, DCU-4 and DCU-6 are connected over memory control interface MCI-B to ports 2, 4 and 6 of the memory control logic MCL-B and to ports 2, 4 and 6 of memory control logic MCL-A. The drum control units 2, 4 and 6 are also extended over memory control interface MCL-B and memory control bus MCB-B to an address bus MAB-B and data bus MDB-B which extends to the memory control logic MCL-B and the memory control interface MCI-B. The central processor CCP-B is connected over a data, address and control bus to port 7 of memory control logic MCL-B and via memory control bus MCB-B to port 8 of memory logic MCL-A.

The duplex memory control logic circuits MCL-A, MCL-B operate in synchronism, and a memory control simplex circuit MCSA, MCSB compares address, data and control signals of the two memory control logic circuits MCC-A, MCL-B, detects mismatches, and provides appropriate error indications.

A system incorporating the preferred embodiment of the present invention will now be briefly described.

General System Description

Figure 2:
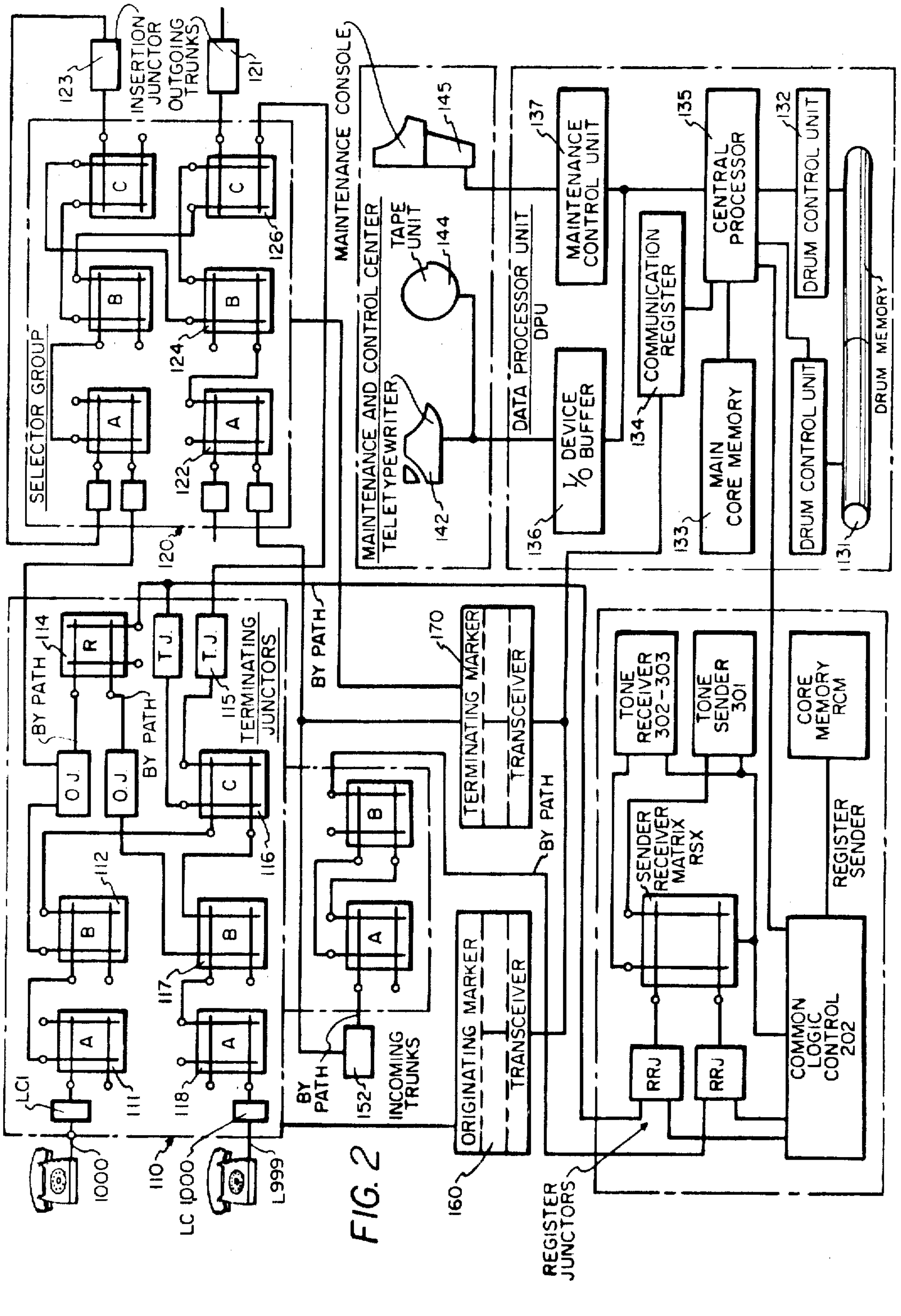
FIG. 2 is a block diagram of a communication switching system incorporating a preferred embodiment of the invention.

The preferred embodiment of the invention is incorporated in a telephone switching system as shown in FIG. 2. The system is disclosed in said system patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000-L999 with a means of accessing the system for originating calls and for providing a means of terminating calls destined for local customers. The trunk-generator group 150 also includes read-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-resistor 150, and the selector group 120 form the switching network for this system and provide full-metallic paths through the office for signaling and transmission.

The originating marker 160 provides high-speed control of the switching network to connect calls entering the system to the register-sender 200. The terminating markers 170 control the switching networks of the selector group 120 for establishing connections therethrough; and if a call is to be terminated at a local customer's line in the office then the terminating marker sets up a connection through both the selector group 120 and the line group 110 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register-junctors RRJ function as peripheral units as an interface between the switching network and the common logic circuits of the register-sender. The ferrite core memory RCM stores the digital information under the control of a common logic 202. Incoming digits may be supplied from the register-junctors via a sender-receiver matrix RSX and tone receivers 302–303 to a common logic, or may be received in dial pulse mode directly from the register-junctors. Digits may be outpulsed by dial pulse generators directly from a register-junctor or multifrequency senders 301 which are selectively connected to the register-junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other sub-systems such as the data processor unit 130 on a random access basis.

The data processor unit DPU provides stored program computer control for processing calls through the system. Instructions provided by the unit DPU are utilized by the registers RS and other sub-systems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register-sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling the called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register-junctor RRJ of the register-sender RS, and at the same time provides a separate signaling path from the register-sender to the selector group 120 for outpulsing, when required. The originating junctor isolates the calling line until cutthrough is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originating calls, the originating marker detects calls for service in the line matrix, controls path selection between the line and originating junctors and between originating junctors and register-junctors. On incoming trunk calls the originating marker 160 detects calls for service in the incoming trunks connected to the trunk register group 150 and controls path selection between the incoming trunks 152 and register-junctors RRJ.

The terminating marker 170 controls the selection of idle paths in the establishing of connections for terminating calls. The terminating marker 170 closes a matrix access circuit which connects the terminating marker selector group 120 containing the inlet being used by the call being terminated, and if the call is terminated in a local line, the terminating marker 170 closes another access circuit which in turn connects the marker to the line group 110. The marker connects an inlet of the selector group to an idle junctor or trunk circuit. If the call is to an idle line the terminating marker selects an idle terminating junctor and connects it to a line group inlet as well as connecting it to a selector group outlet. For this purpose the appropriate idle junctor is selected and a path through the line group 110 and the selector group 120 is established.

The data procesor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

Typical Call

This part presents a simplified explanation of how a basic call is processed by the system. The following call type is covered: call from a local party served by one switching unit to another local party served by the same switching unit.

In the following presentations, reed relays are referred to as correeds. Not all of the data processing operations which take place are included.

When a customer goes off-hook, the D. C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register MCR and sent to the data processor unit via its communication transceiver CCR.

While sending line number identity (LNI) and route data to the data processor, the marker operates and tests the path from the calling line to the register-junctor. The closed loop from the calling station operates the register-junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register-junctor, plus control and status information. The control and status information is used by the data processor control program in selecting the proper function to be performed on the data frame.

The data processor analyzes the data frame sent to it, and from it determines the register-junctor identity. A register-junctor translation is required because there is no direct relationship between the register-junctor identity as found by the marker and the actual register-junctor identity. The regiser-junctor number specifies a unique cell of storage in the core memories of both the register-sender and the data processor, and is used to identify the call as it is processed by the remaining call processing programs.

Once the register-junctor identity is known, the data frame is stored in the data processor's call history table (addressed indirectly by register-junctor number), and the register-sender is notified that an origination has been processed to the specified register-junctor.

Upon detecting the pulsing highway and a notification from the data processor that an origination has been processed to the specified register-junctor, the central control circuits of the register-sender sets up a hold ground in the register-junctor. The marker, after observing the register-junctor hold ground and that the network is holding, disconnects from the matrix. The entire marker operation takes approximately 75 milliseconds.

Following the register-junctor translation, the data processor performs a class-of-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register-junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register-junctor.

Before the transfer of data to the register-sender memory takes place, the class-of-service information is first analyzed to see if special action is required (e.g., non-dial lines or blocked originations). The register-junctor is informed of any special services the call it is handling must have. This is accomplished by the data processor loading the results of the class-of-service translation into the register-sender memory words associated with the register-junctor.

After a tone receiver connection (if required), the register-junctor returns dial tone and the customer proceeds to key (touch calling telephone sets) or dial the directory number of the desired party. (Party test on ANI lines is performed at this time.)

The register-junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function — the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g. ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, and the call is forwarded to the called party and terminated.

A check is made of the idle state of the data processor communication register, and a terminating marker. If both are idle, the data processor writes into register-sender core memory that this register-junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases then informs the data processor of the identity of the path and that the connection has been established. The data processor recognizes from the terminating class that no further extension of this call is required. It then addresses the register-sender core memory with instructions to switch the originating path through the originating junctor.

The register-junctor signals the originating junctor to switch through the disconnects from the path, releasing the R matrix. The originating junctor remains held by the terminating junctor via the selector matrix. The register-sender clears its associated memory slot and releases itself from the cell. The dedicated call history table (for that register) in the data processor core memory is returned to idle.

Memory Control Arrangement — General Description

Computer Control Processor CCP

The function of the computer central processor CCP (shown in FIG. 2) is to obtain program instructions stored in the computer main memory shown in FIG. 2, decode each instruction, and perform the operations specified by the instruction.

The computer processor CCP is duplexed for purposes of reliability. An executive program stored in the main memory CMM controls allocation of central processor time and computer core main memory. The central processor CCP retrieves program instructions stored in core main memory CMM, decodes these instructions, and performs the operations specified by the instructions. The central processor CCP has the capability of performing arithmetic and/or logical operations, and through the use of associated registers and buses can transfer data between subsystems of the system.

The central processor CCP also, under software control, recognizes and processes interrupts from all subsystems, and routines the subsystems for maintenance. It responds to interrupts such as requests for service and abnormal conditions.

There are two "buses" in the central processor as well as the memory control CMC: the data bus (26 bits — 24 data bits, one parity bit, and one memory protect bit), and an address bus (19 bits — 17 address bits and one parity bit). The buses are used for buffering during data and address transfers between the central processor and other subsytems, and for register-to-register transfers within the central processor. The data bus receives data from the register-sender, the input-output devices (via the channel multiplexor), and the computer core main memory CMM (via the memory control CMC). It also receives external data from a computer line processor CLP (sense lines), and a third party circuit TPC (maintenance data).

The address bus receives addresses for computer core main memory CMM or register-sender memory RSM (FIG. 2) locations from a designated address source. It supplies addresses, through appropriate interface, to the main memory CMM (via the memory control CMC) (FIG. 1) or to a register-sender memory RSM, and also to the computer third party circuit CTP.

Computer Main Memory CMM

The main memory CMM is a random access, ferrite-core memory used to store instructions and data for use by the computer central processor. Exchange of data between the main memory CMM and the drum memory system can be accomplished by the processor CCP via the computer memory control CMC. The accessing unit may address any core location directly by supplying the proper address. Each memory data register MDR, and read-write control circuitry.

The main memory CMM is capable of four modes of operation, but only read/modify/write (R/M/W) and read/not modify/write (R/$\overline{M}$/W) modes are used by the data processor unit DPU. The mode R/M/W is used by the central processor CCP when new data is to be written into care or when the data contents of memory are to be modified. The mode R/$\overline{M}$/W is used by the central processor CCP for read only operations.

The memory CMM is broken up into many individual locations. Each memory location can hold one 26-bit word and is given an address. The address identifies the location of one word. Program words are stored using consecutive addresses.

There are several computer core main memory CMM capacities. Core main memory can store from 32,768 (32K) 26-bit words to a possible 131,073 (128K) word capacity (1K is equivalent to 1024 26-bit words). A 96K main memory CMM should be adequate for a 5,000 to 10,000 line office configuration.

Computer Memory Control CMC

The primary function of the computer memory control CMC is to provide multiple access paths to various memory modules in main memory CMM. The computer memory control CMC can be thought of as a bidirectional multiplex-distributor where access path can transfer data to any memory module in main memory CMM, and data from any memory module can be transferred to any access path on a one-at-a-time basis.

The computer memory control CMC provides memory access control, data transfer control, and memory port selection to permit data transfer between the computer main memory CMM and the central processor CCP or auxiliary memory which may be a drum memory system.

FIG. 1 shows the one configuration having six drum control units DCU, and the duplexed central processor CCP-A, CCP-B and memory control CMC-A, CMC-B. If the central processor CCP or a drum control unit DCU presents a read or write request to the memory control CMC, the memory control CMC will select the port presenting the request (assuming no other ports have memory requests).

The memory control CMC of the exemplary embodiment uses eight ports through which up to six drum control units DCU(1–6) and the central processor (CCP) are connected. Simultaneous memory requests are resolved by a predetermined priority assignment to each port. Ports 1–6 are assigned to the drum control units DCU(1–6). The central processor CCP is assigned to port 7 (lowest priority). Service of one memory request is always completed before another is started. The next request to be serviced is always the one of the highest priority in the queue (total requests waiting to be processed). Port 8 on each memory control CMC-A, CMC-B is used for a cross-write feature. When one central processor is off-line, cross write is used to keep the data contained in the computer main memory associated with the off-line central processor, identical with the data contained in the memory associated with the on-line central processor.

Program Protection

The program protect system of the computer memory control CMC provides the following four types of protection for the computer core main memory CMM:

a. Switch-protected read only memory
b. Software-protected read only memory
c. Initialization table protection
d. Block transfer area (non-resident area) protection

Switch Protected Read Only Memory

Switch-protected read only memory provides hardware protection for blocks of memory locations in "core". Control of this protection is provided by a switch on a subsystem display panel or a maintenance display and control frame MDCF. This switch is called the "central processor memory protect disable" pushbutton. There are two of these pushbutton switches on the display panel, one for each central processor CCP-A, CCP-B. When this switch is not activated, memory protection is in effect for the central processor CCP and the drum control units DCU(1–6). However, when the pushbutton switch is activated, memory protection is inhibited. In this "protect inhibited mode", a protected block of words in core may be written into.

Bit 25 of each word in this block may be written into when the INHIBIT MEMORY PROTECT pushbutton on the frame MDCF is operated and a flip-flop PCROM is reset. Bit 25 will be written true if the MIS instruction MPS (03700040) has set the Write Memory Protect Bit storage element (WMPB). Bit 25 will be written False if the MIS instruction MPR (03700100) has reset storage element WMPB.

Switch-Protected Read Only Memory is strappable to 512 or 1024 words and may start at location 0 or 512 but does not extend beyond location 1023.

Software-Protected Read Only Memory

Software-protected read only memory provides program protection of individual words written into core by the central processor CCP. This protection is accomplished via the 26th bit of the word (bit 25). The central processor CCP cannot write into a location in core that has bit 25 "set", however, the drum control units DCU(1–6) may over-write these software-protected locations. It is also possible to have software-protected words in core that are also switch-protected.

The Computer Maintenance Panel (PNL) or the Computer Programming Console (PRC) write through the Central Processor CCP and therefore protection is in effect for these units. Software Protection, Bit 25 written True in core, may be applied to any location in core. Protection, however, is redundant in Switch-Protected Read only Memory. A Software Read Only Memory Error will be generated when trying to write into a software-protected location in Switch-Protected Read Only Memory.

A flip-flop PCROM Active (program controlled read only memory) located in the computer memory control CMC is controlled by control pulse directive (CPD) instructions and can be interrogated via sense lines.

When the flip flop (PCROM) Active is set and the INHIBIT MEMORY PROTECT pushbutton has not been operated (Memory Protect System 'ACTIVE' state), the central processor CCP, maintenance panel PNL or programming console PRC cannot write into core locations which have Bit 25 True. The processor CCP, panel PNL or console PRC can write into core locations which have Bit 25 False, and Bit 25 will be written into core as a Zero (false).

When the flip-flop PCROM Active is reset and the INHIBIT MEMORY PROTECT pushbutton has not been operated (Memory Protect System "ACTIVE" state) the processor CCP, panel PNL or console PRC can write into all core locations except Switch Protected Read Only Memory. Bit 25 will be written into Core as a One if the flip-flop WMPB is set or as a Zero if flip-flop WMPB is reset. If the flip-flop PCROM active and INHIBIT MEMORY PROTECT pushbutton has been operated (Memory Protect System 'INHIBITED' state) the processor CCP, panel PNL or console PRC can write into any core location.

When the INHIBIT MEMORY PROTECT pushbutton has been operated (Memory Protect System 'Inhibited' state) the CCP can write into any core location. However, if the flip-flop PCROM Active is set and the processor CCP writes into core, Bit 25 in core will always be written as Zero regardless of the state of flip-flop WMPB and correct parity will be provided by memory control CMC.

Initialization Table Protection

A 64-word block of main memory CMM is dedicated to each drum control unit DCU(1–6) as its initialization table ITE that contains directives and associated data necessary to facilitate transfer of data from drum to core or from core to drum. When a drum control unit DCU is being initialized (lead Init to memory control CMC True) such drum control unit may access only its own initialization table ITE. When a drum control unit DCU is in its initialization phase, a check is made to assure that the core address supplied by the drum control unit DCU is within the specified table ITE. If the address is incorrect, a "drum table error" will occur and the write operation will be aborted. The starting location of the first drum control unit Initialization Table is strapped to the last word (word 511) of the 512-word inititalization tables block minus (*initialization* 1)×64, where $n$=2, 4, 6 is the TOTAL number of drum control units connected to memory control CMC. In this way the Initialization Tables ITE occupy the highest-numbered addresses in the 512 -word block leaving the last 64 words at the end of the block for other usage (trap and interrupt addresses). The 512-word block may be strapped in increments of 512 words to any location in core. However, the trap and Interrupt addresses generated by the CCP are not relocatable.

A drum control unit DCU may write into the table ITE of another drum control unit DCU only when it is "privileged", i.e., when a lead PT to the memory control CMC is true, or when the switch "memory protect disable" is operated.

In summary, a drum control unit DCU may access only its own initialization table ITE when it is the initialization sequence and a drum control unit DCU may not write outside an assigned initialization table ITE or the Block Transfer Area unless such drum control unit is privileged or the INHIBIT MEMORY PROTECT pushbutton is operated. All drum control initialization tables are contiguous within a 512-word block of main memory CMM.

Block Transfer Protection

The block tranfer or non-resident area is a section of core that is reserved for data transfers from the drum memory system. The other core area used for this purpose is the initialization table ITE. If a drum control unit DCU is writing into main memory CMM and is not designated as being "privileged", a check is made to see that such drum control unit is writing within the block transfer area (or its initialization table ITE). If it is not writing within the proper area, a drum table error will be generated and the write operation will be aborted. A "privileged" drum control unit DCU may write in any core location except switch-protected read only memory areas. When this switch protection is inhibited by operating the "memory protect disable" pushbutton, a drum control unit DCU may write into any core location.

Computer Memory Control Arrangement

Figure 3:
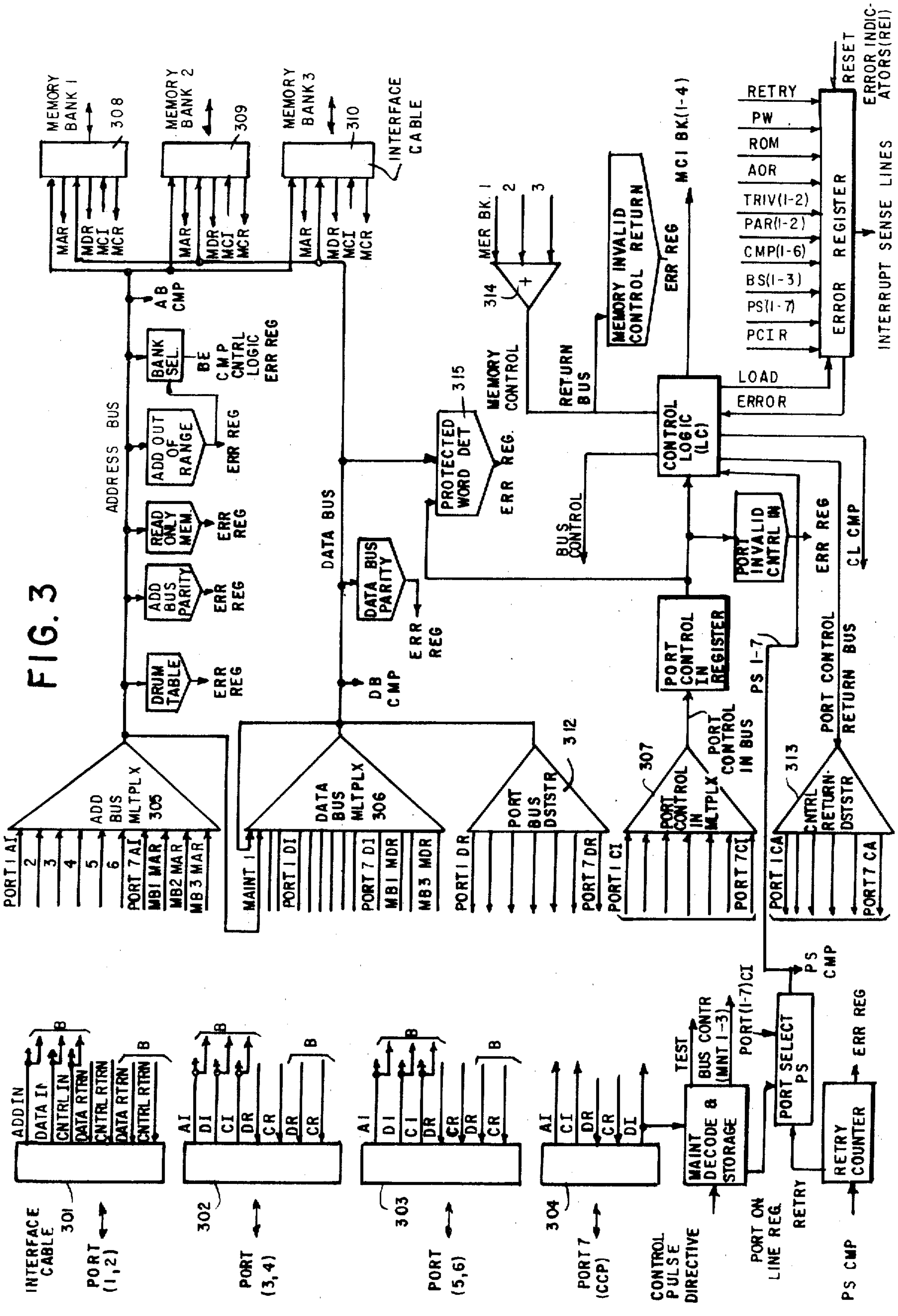
FIG. 3 is a detailed block diagram of one of the computer memory control units shown in FIG. 1.

Referring to FIG. 3, there is shown a block diagram for one of the computer memory control CMC-A which controls access to memory banks (1–4)A of the computer main memory CMM-A. Ports 1 and 2 of the memory control unit CMC-A are connected over interface cable 301 to drum control units DCU-1 and DCU-2. Similarly, ports 3, 4 and 5, 6 are connected over cables 302 and 303, respectively, to drum control units DCU-3, DCU-4, and DCU-5, DCU-6. Each of the interface cables 301–303 provides an address IN bus AI, a data IN bus DI, and a control IN bus CI for the associated drum control units DCU-1 through DCU-6. The control inputs may include a read command (RR), a write command (WR), or status indications, such as privileged transfer (PT) or drum accessing its initialization table INIT. For a privileged transfer status, an accessing unit, either a drum control unit DCU, or the central processor CCP-A will be enabled to write over software protected areas. Also, a drum control unit DCU will be enabled to write into the initialization table ITE assigned to a different drum control unit. The initialization status enables a determination to be made for a write request that a drum control unit which is privleged is accessing its assigned initialization table.

The address IN AI, data IN DI and control IN CI buses connected to drum control units DCU-1 to DCU-6 are also multiplexed and extended to memory control CMC-B to ports 1–6, respectively.

Port 7 of the computer memory control unit CMC-A is connected over an interface cable 304 to the central processor CCP-A which supplies address inputs, data inputs and control inputs to port 7 of the computer memory control CMC-A.

The address input buses Port (1–7) AI are extended to individual inputs Port 1-AI through Port 7-AI of an address bus multiplex circuit 305 which has an output connected to a memory address bus MAB.

The data input buses Port (1–7) DI are extended to inputs Port 1-DI through Port 7-DI of a data bus multiplex circuit 306 which has an output connected to a memory data bus MDB.

The control input buses Port (1–7) CI are extended to individual inputs Port 1-CI through Port 7-CI of a port control input multiplex circuit 307 which has an output connected to a port control in bus PCIB. The control input buses Port (1–7) CI are also extended to a port select register PS which supplies control signals to logic circuits LC of the memory control logic MCL which determines which port will be selected for a memory request.

In addition, data and control signals are returned from a date bus distributor 312 and a control return distributor 313 over data return and control return buses DR and CR and interface cables 301–304 to the drum control units DCU(1–6) and the central processor CCP-A.

The logic circuits CL generate bus control signals for the address bus multiplex circuit 304, data bus multiplex circuit 305, the port control in multiplex circuit 306, the data bus distributor 312 and the control return distributor 313 to gate signals between a selected port and the memory address bus MAB, memory data bus MDB, the port control in bus PCIB, and the port control return bus PCRB.

The address supplied by a selected port is extended to the memory address bus MAB and the control inputs are extended to the port control IN bus and loaded into the port control IN register PCIR. The memory address bus MAB is extended over memory interface cable 308–311 to the memory bank MB (1–4) of the computer main memory CMM. In addition, the memory address bus MAB is connected to a bank select circuit BS which receives the memory address provided over the selected port to enable selection of the indicated memory bank (1–4)A.

General Operational Description of Memory Control

The memory control CMC operates on a request acknowledge basis. If no requests are presented by the drum control units, DCU(1–6) or the central processor CCP, the memory control CMC and the memory CMM are idle. The central processor is pre-selected as the Address Bus Source or accessing unit at the end of each memory request and remains pre-selected if no requests are presented to the memory control CMC. This enables accelerated access to main memory CMM by the central processor CCP.

If a memory request is presented to the memory control CMC a 350 ns timer is started to allow selection of the port making the request and to allow the address to propagate to the blank selection circuitry and to the memory banks. At the end of the 350 ns delay if the main memory CMM-A has finished a previous request, a Start Read command is provided over memory control inputs MCI to the main memory bank CMM(1–4) specified by the memory address supplied by the requesting port.

When the address from the selected port is gated to the memory address bus MAB, the address checks are made to determine if the address is within the range of the memory banks CMM(1–4)A, that the address is not one of the hardware read only protected memory locations (ROM), and, when the selected port corresponds to one of the drum control units DCU(1–6), to determine that the address is within the initialization table for such drum control unit or is within the block transfer or non-resident storage area of the memory banks CMM(1–4)A.

The memory clock circuit returns a signal MEMORY BUSY to the control logic CL of the computer memory control CMC-A over a memory control distributor 314 and a memory control return bus MCRB after the data word stored at the addressed location in the memory CMM has been read into data registers of the main memory CMM, the memory returns a signal DATA AVAILABLE to the control logic CL over the distributor 314 and bus MCRB. On a read request, the signal DATA available and the data will be returned to the port within 1.0 microseconds after the request was received. The control logic CL enables the data read into the memory register to be extended to the data bus MDB over memory data return output MDR of the computer main memory CMM. The data word returned to the data bus MDB from the computer main memory CMM is checked by a protected word detecting circuit 315 to determine if the addressed storage location is software protected. In such case, the central processor CCP-A is prevented from writing into such location unless the central processor CCP is privileged as indicated by a control input supplied to the port control in register PCIR.

For a read request, as indicated by the control input supplied to the port control IN register PCIR, the data word read out is gated to the data bus distributor 312 and returned to the selected port over a corresponding data return bus port (1–7)DR to the drum control unit DCU(1–6) or central processor CCP which has been selected. Also, for a read request, a signal RESTORE CONTROL is generated by the control logic MCL and extended to the computer main memory CMM, and the word read from the main memory CMM is read back into the main memory CMM at the addressed location.

For a write request, when the signal DATA AVAILABLE terminates, the control logic CL gates the data appearing at the input port (1–7)DI of the data bus multiplex 306, to the memory data bus MDB to enable the data to be read into the data register of the computer main memory CMM.

After the data is loaded into the data register of the computer main memory CMM, the memory clock returns a signal DATA LOADED to the computer memory control CMC-A over a memory control distributor 314 to the control logic CL. Thereafter a signal END OF CYCLE is returned to the memory control CMC-A. At such time, the bank select register BSR is released and if there is a memory request at one of the nonselected ports, such port is selected and the above procedure is repeated.

Failure of a port to remove a read request or write request after it is answered results in a Port Request Time-Out Error. Any error which occurs while a port is accessing the memory causes the port to be locked out except for the central processor CCP, which is never locked out. Also a read request or write request must be removed before the next memory request from that port can be recognized.

The time required for the signal DATA AVAILABLE to be sent to a port after a read request is received varies from 0.8 microseconds to (1.0+1.8N) microseconds where N is the number of the port in the queue. The signal DATA LOADED is sent to port N1.4 to (1.6+1.8N) microseconds after the write request is received.

A word is read from the magnetic drum of the Drum Memory system once every 1.5 to 1.63 microseconds and this means that the maximum time a drum control unit DCU(1–6) can wait for signal DATA LOADED after a write request goes out is 7.5 microseconds. If four drum control units DCU present read requests or write requests to the memory control CMC at a time when the memory control CMC is answering a memory request from the central processor CCP, then one of the drum control units DCU may not have its request answered in the time necessary and a CORE ACCESS TROUBLE indication will be provided. The drum control unit DCU removes its write or read request, and if it does not receive a malfunction indication from the memory control CMC a DCU TIME OUT interrupt is generated eight drum revolutions (approximately 136 milliseconds) after a request was first sent to the drum control unit DCU.

When the duplex memory controls CMC-A, CMC-B are running in sync, the port selections of the memory controls CMC must agree before a port can be selected. When a memory request appears a 350 ns delay is started to allow port selection to take place. At the end of the delay, a comparison is made to see if the port selections agree. If another memory request was being answered when the memory request appeared, the delay is not started until 150 ns after the fall of the DATA AVAILABLE signal from the first request.

If two ports present read requests at the same time it would be possible for the duplex memory controls CMC-A, CMC-B to select different ports. When at the end of the delay the port selections do not agree, a second delay of 150 nanoseconds is started and at the end of it a retry at port selection can be made. After the third retry a port is selected regardless of whether the port selections compare. If three retries have been made and the port selections do not agree, an error interrupt is generated. Any write operations are aborted to a read operation, and an Abort write output will become true. Each retry adds a maximum of 614 ns to the time required for port selection so that if three retries are made, the third drum control DCU receives a DATA LOADED signal within 7042 ns which is within the 7500 ns maximum required to guarantee that a drum control unit DCU does not encounter port blockage.

Detailed Description of Computer Memory Control

The computer memory control CMC is duplexed within the data processor unit DPU as shown in FIG. 1, including memory control logic MCL-A and memory control logic MCL-B. A memory control simplex circuit MCS (A and B) is operable to compare the operations of the memory control logic MCL-A and MCL-B and to provide indications of lack of synchronization between the two memory control logic units MCL-A and MCL-B or differences in signals being processed by the memory control logic units MCL-A and MCL-B.

The circuits of the computer memory control CMC and associated interface cables are shown in FIGS. 4–20.

Figure 4:
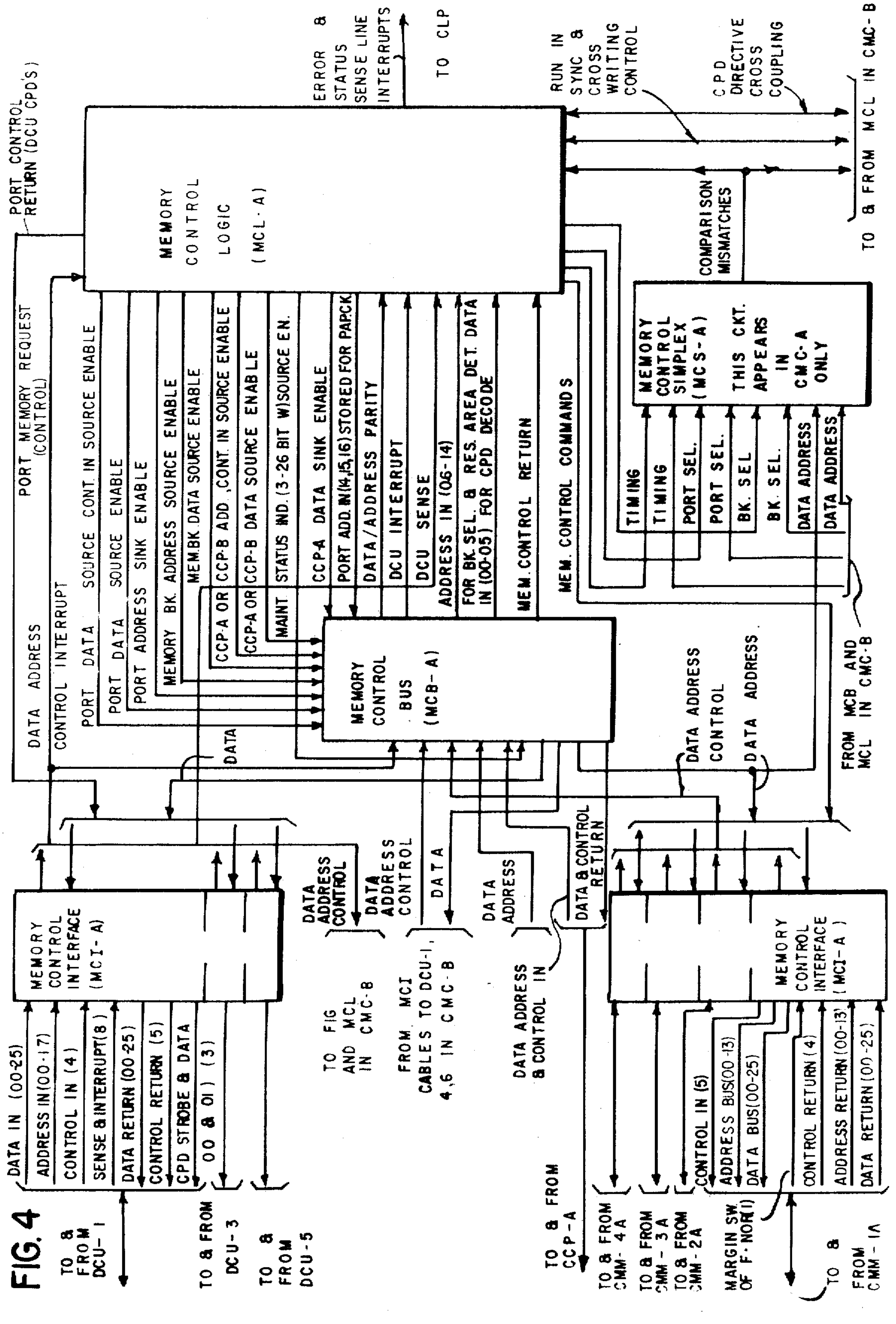
FIG. 4 is a simplex block diagram of the computer memory control indicating input and output lead designations between various subcircuits of the unit.
Figure 6:
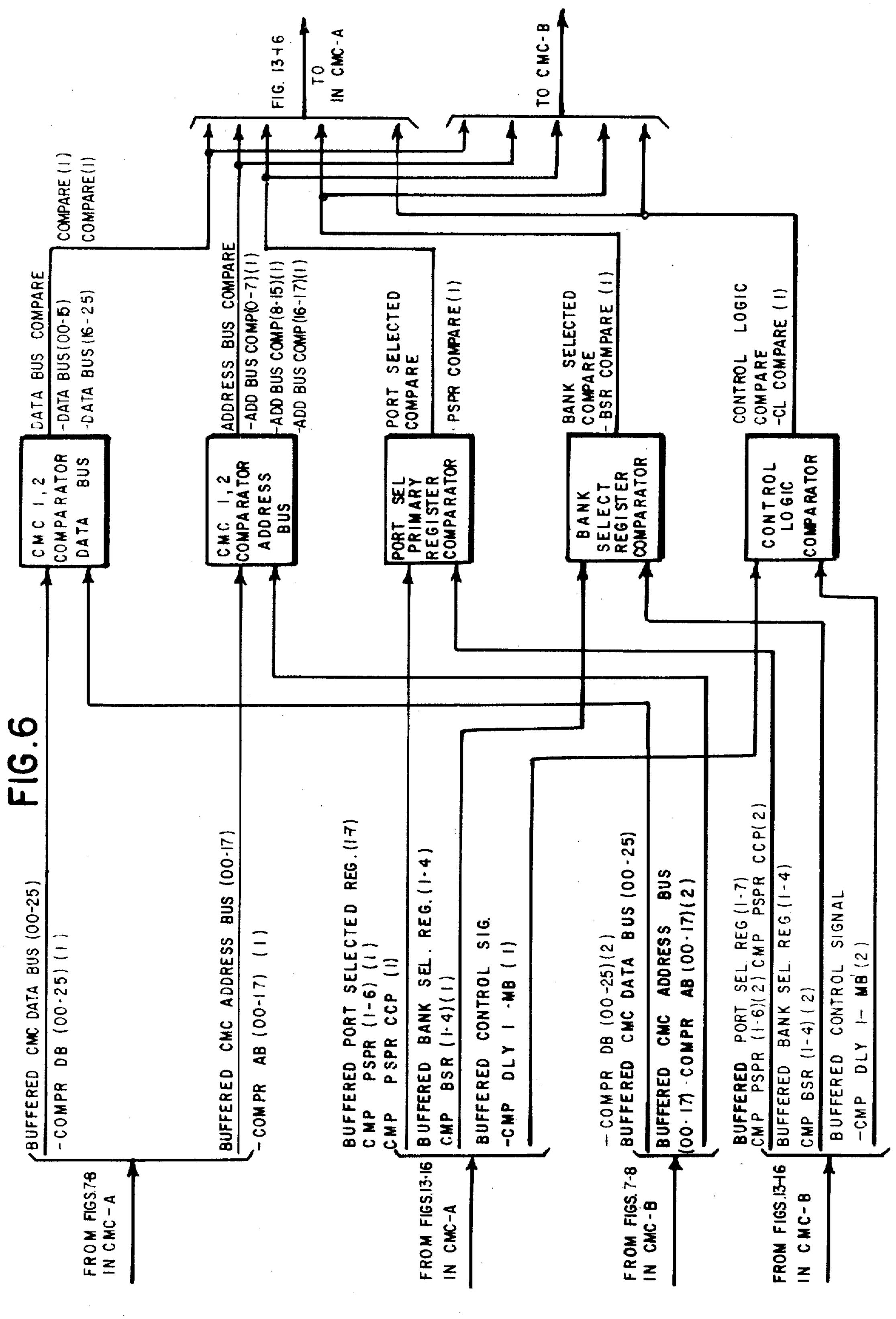
FIG. 6 is a block diagram of the symplex comparator circuit shown in FIG. 1.

FIG. 4 shows a simplex block diagram which shows the memory control logic MCL-A and the memory control simplex MCS-A and the memory control interface MCI-A. A block diagram of the simplex comparator circuit MCSA is shown in FIG. 6.

Figure 5:
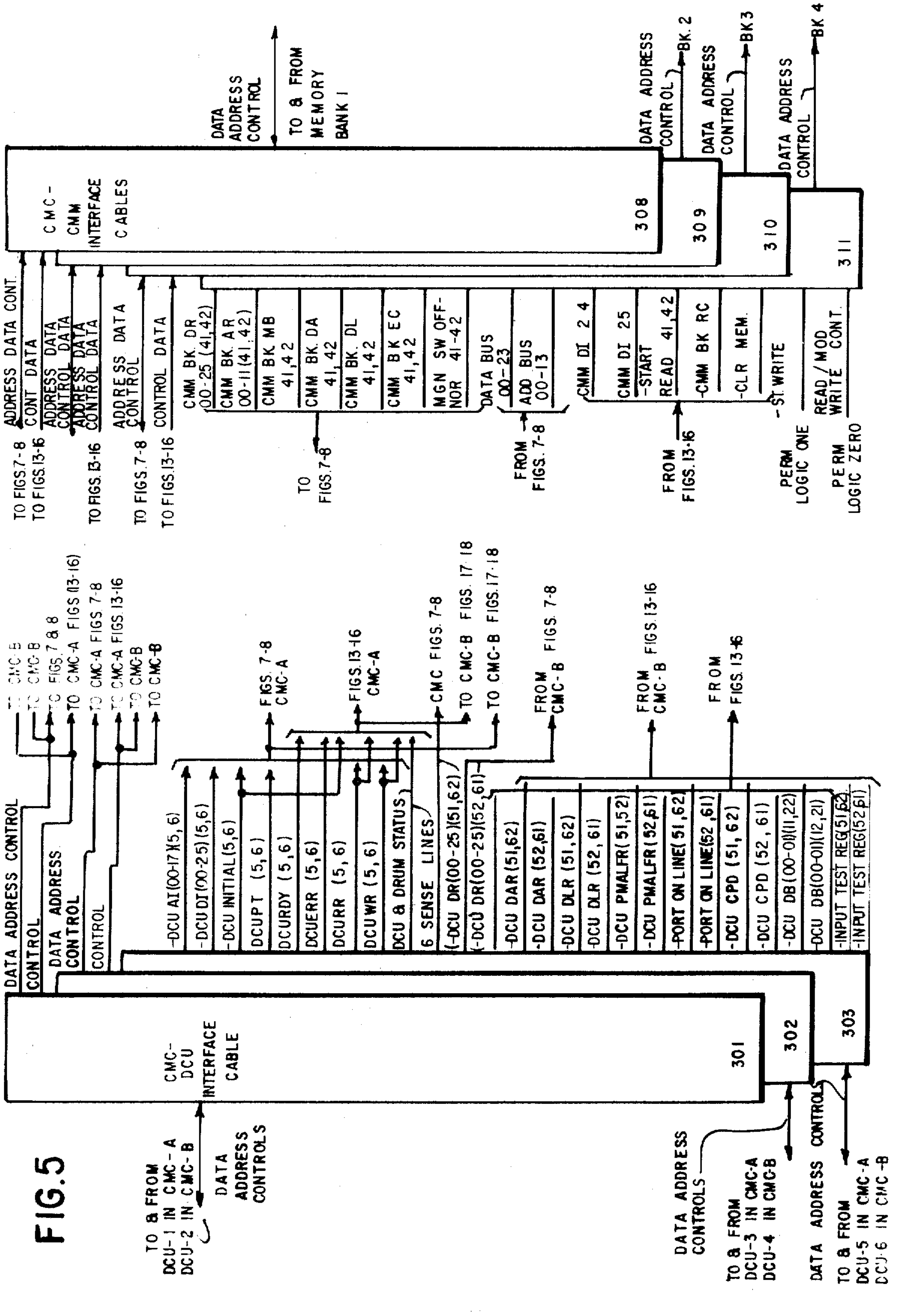
FIG. 5 is a block diagram of the memory control interface.

The memory control interface cables 301–304 (FIG. 3) for the computer memory control unit and the drum control units DCU-1 through DCU-6 are shown in FIG. 5 along with the interface cables 308–311 for the memory banks (1–4) of the computer main memory CMM and the computer memory control CMC.

Figure 7:
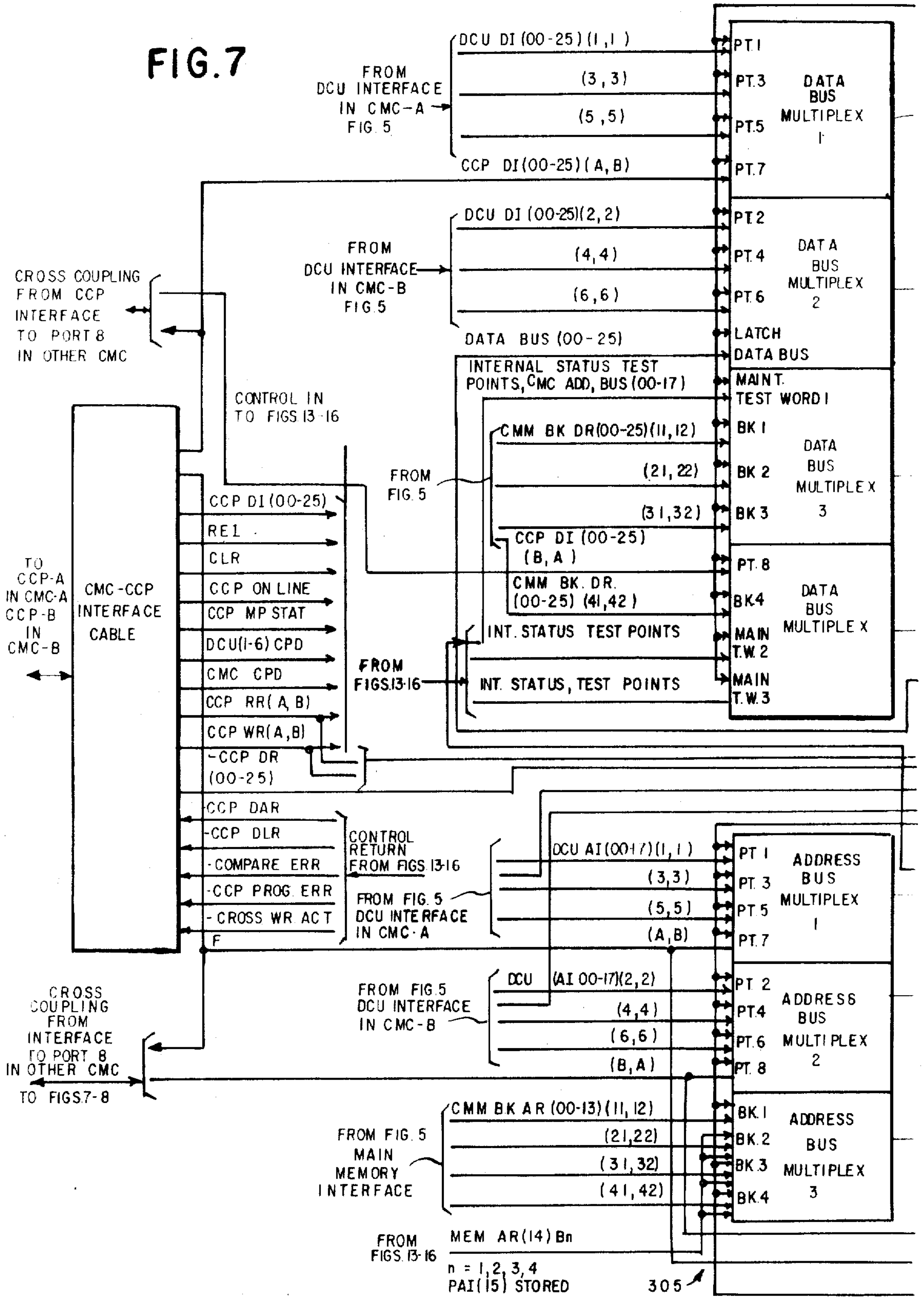
FIGS. 7 and 8 are a block diagram of the bus circuit for the system shown in FIG. 1.
Figure 8:
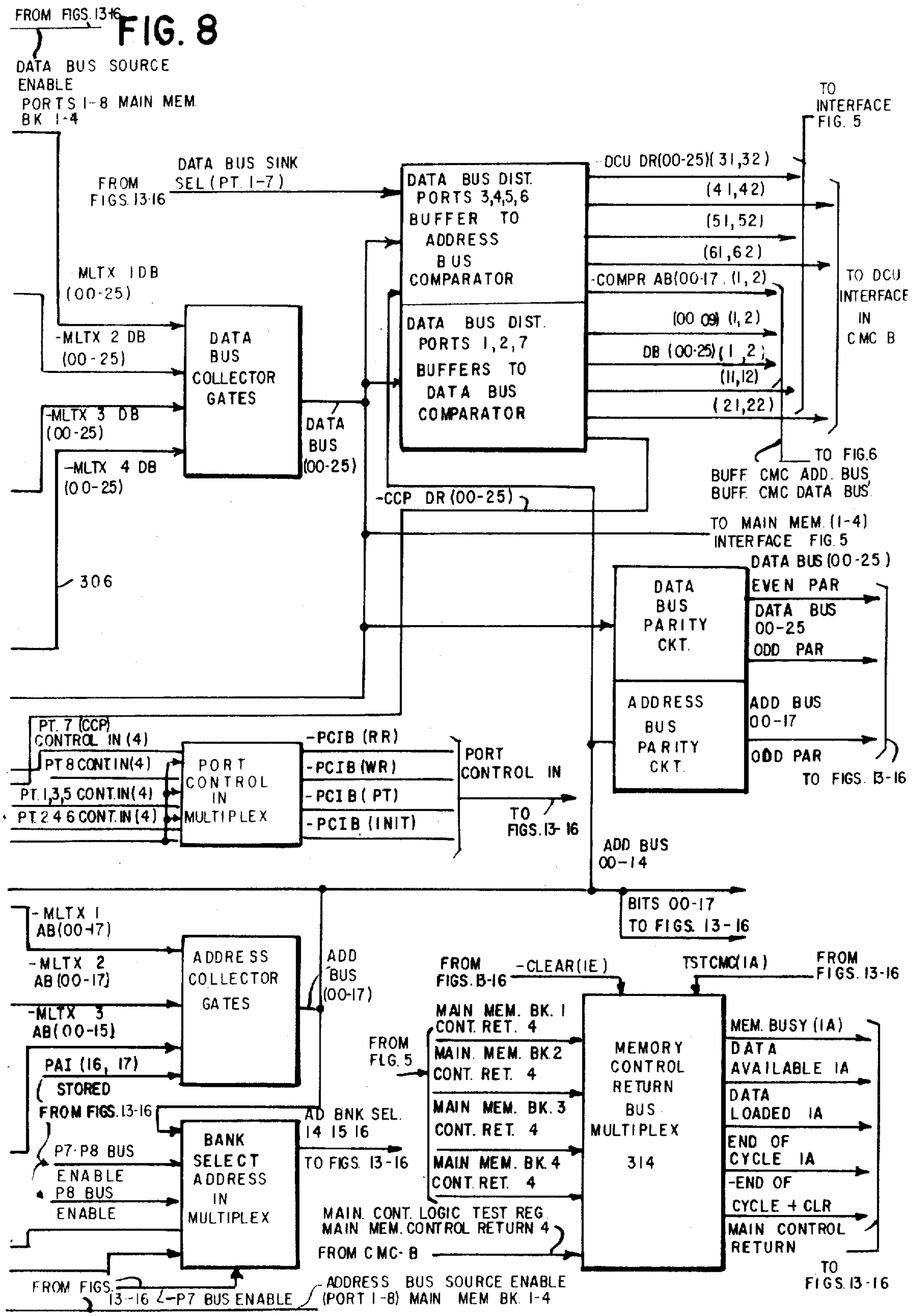

FIGS. 7 and 8 when arranged in side by side relationship provide a block diagram of the address and data bus multiplexers 305 and 306 (FIG. 3) which include lead designations indicating the source of inputs to the address and data bus multiplexers 305 and 306 and outputs to the computer main memory CMM. FIG. 8 also shows the memory control return bus multiplex 314 which returns control signals from the computer main memory CMM to the control logic CL of the computer memory control CMC-A.

Figure 9:
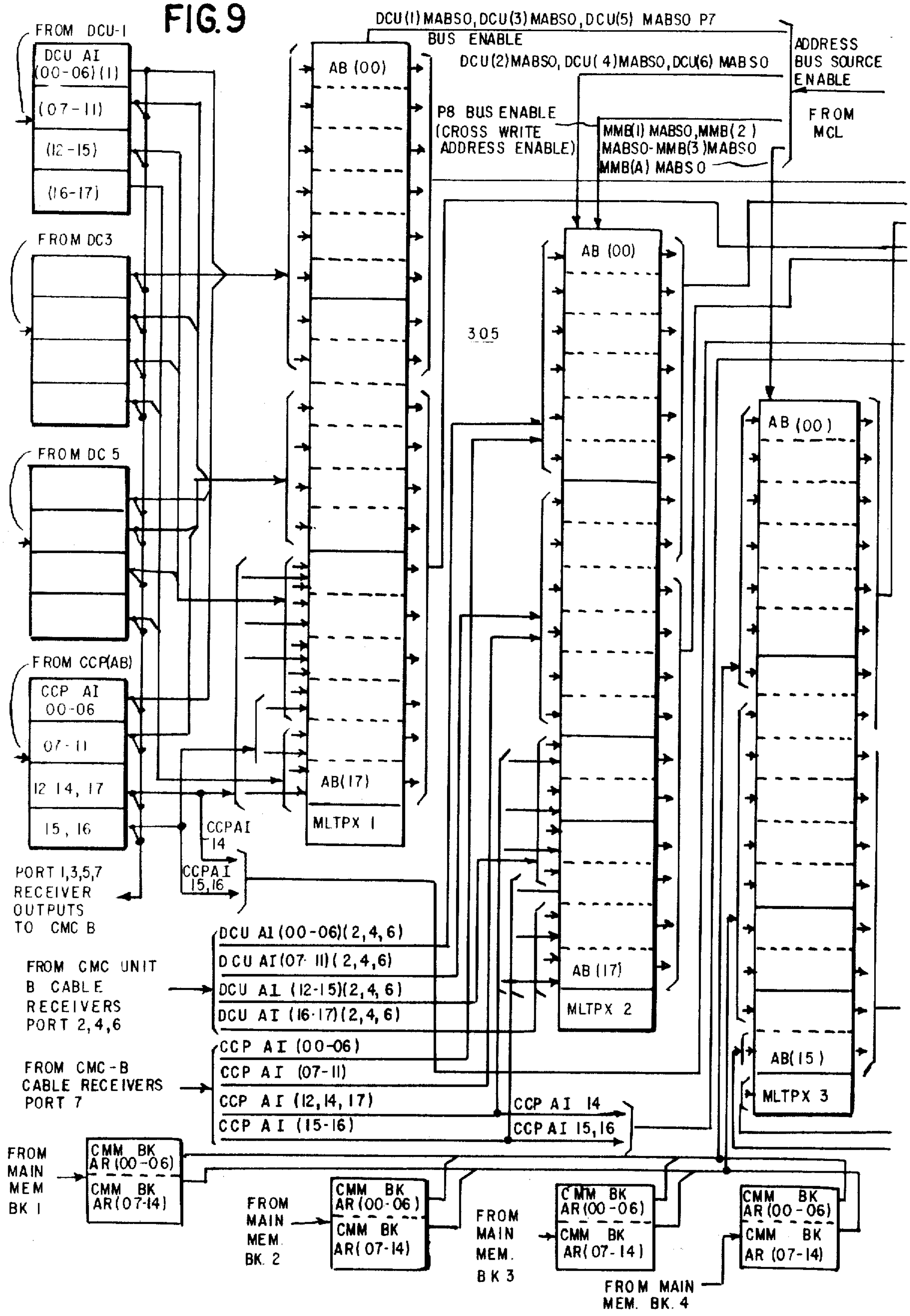
FIGS. 9 and 10 provide a block diagram of the computer memory control address circuit.
Figure 10:
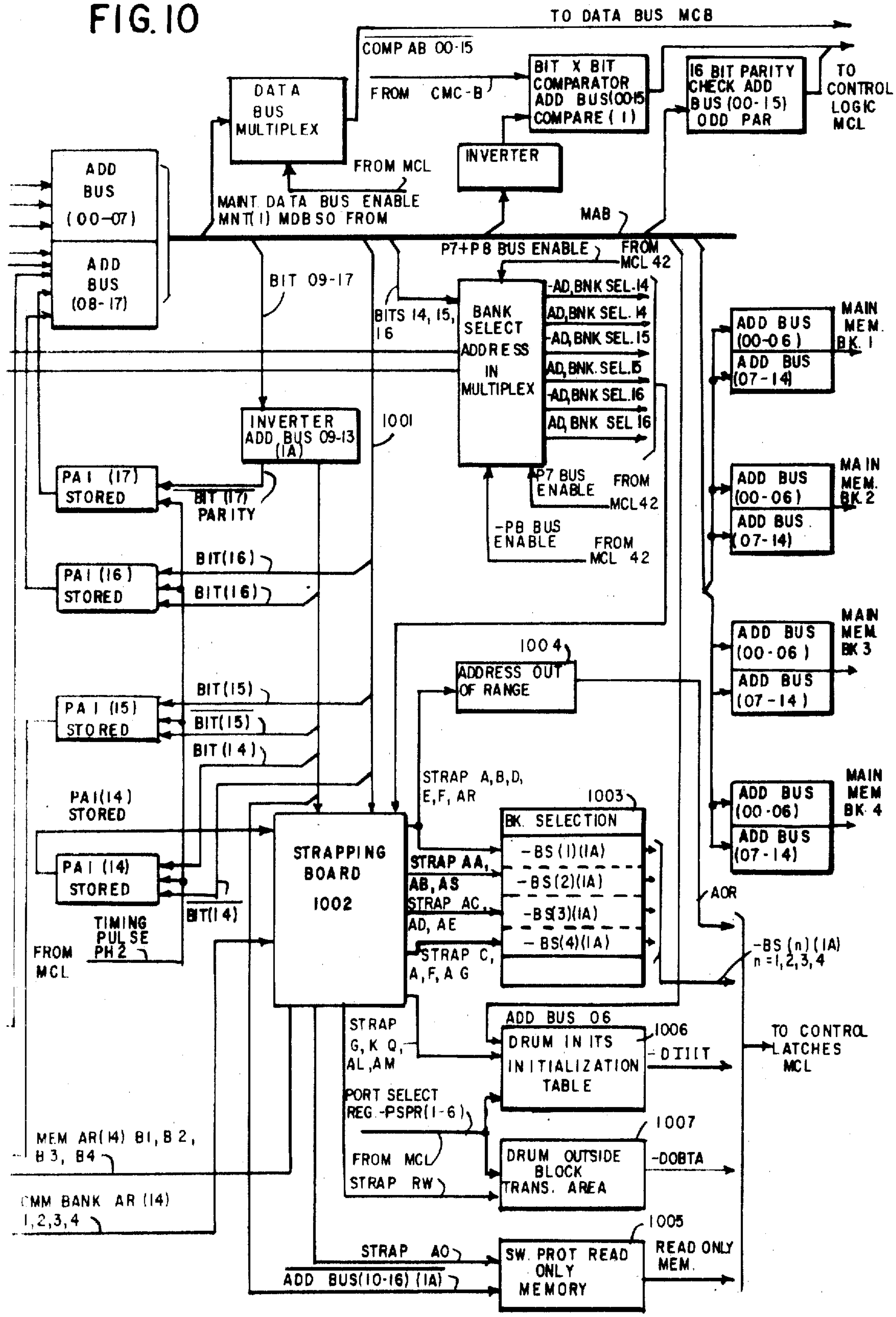

FIGS. 9 and 10 when arranged in side by side relationship show the address circuit for the computer memory control CMC-A which includes the address bus multiplexer 305, shown in FIG. 9, the memory address bus MAB shown in FIG. 10. Also shown in FIG. 10 are the bank select circuit 1003, address out of range detector 1004, switch protected read only memory detector 1005, drum in its initialization table detector 1006 and drum outside block transfer area detector 1007.

Figure 11:
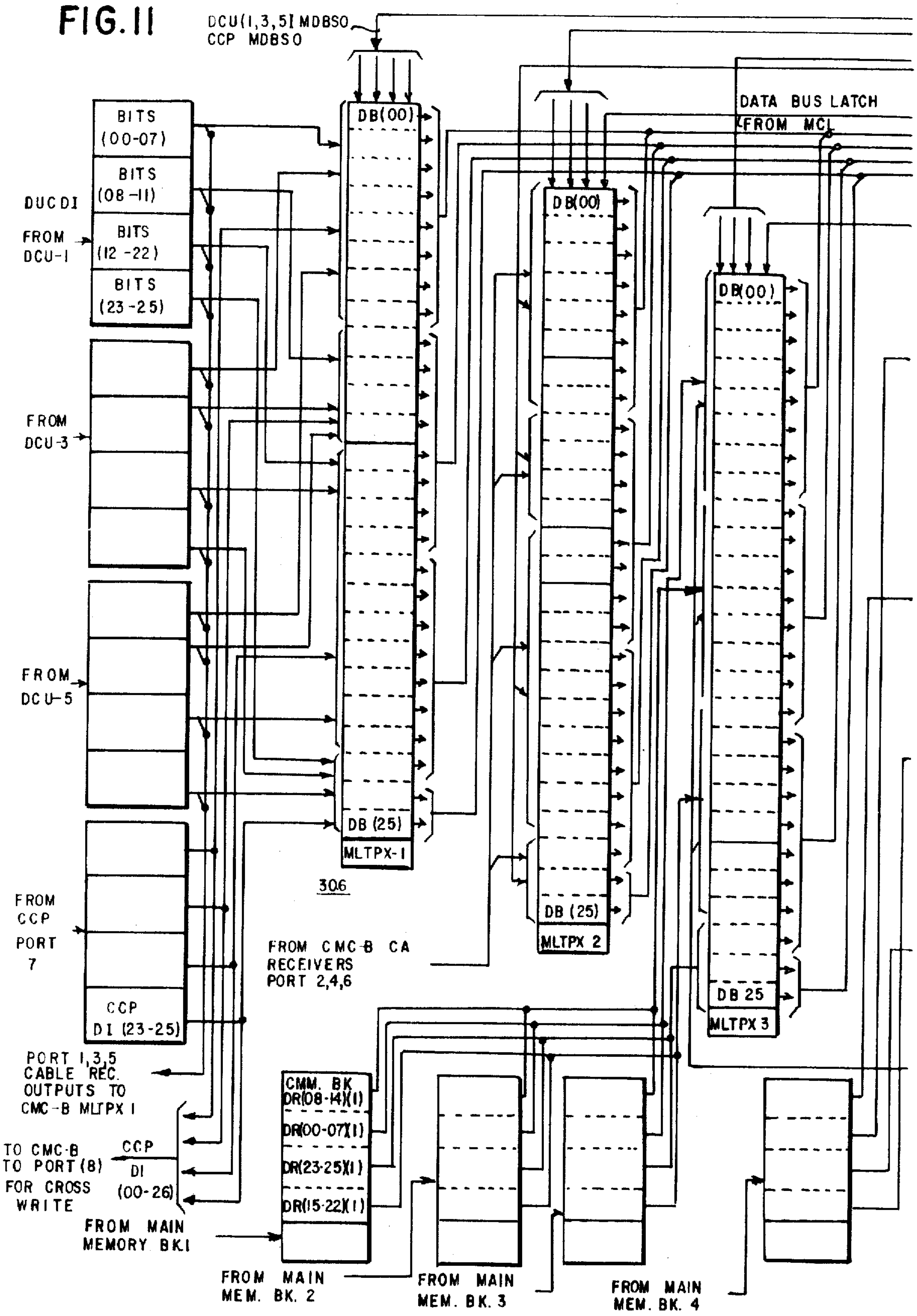
FIGS. 11 and 12 provide a block diagram of the data circuit for the computer memory control.
Figure 12:
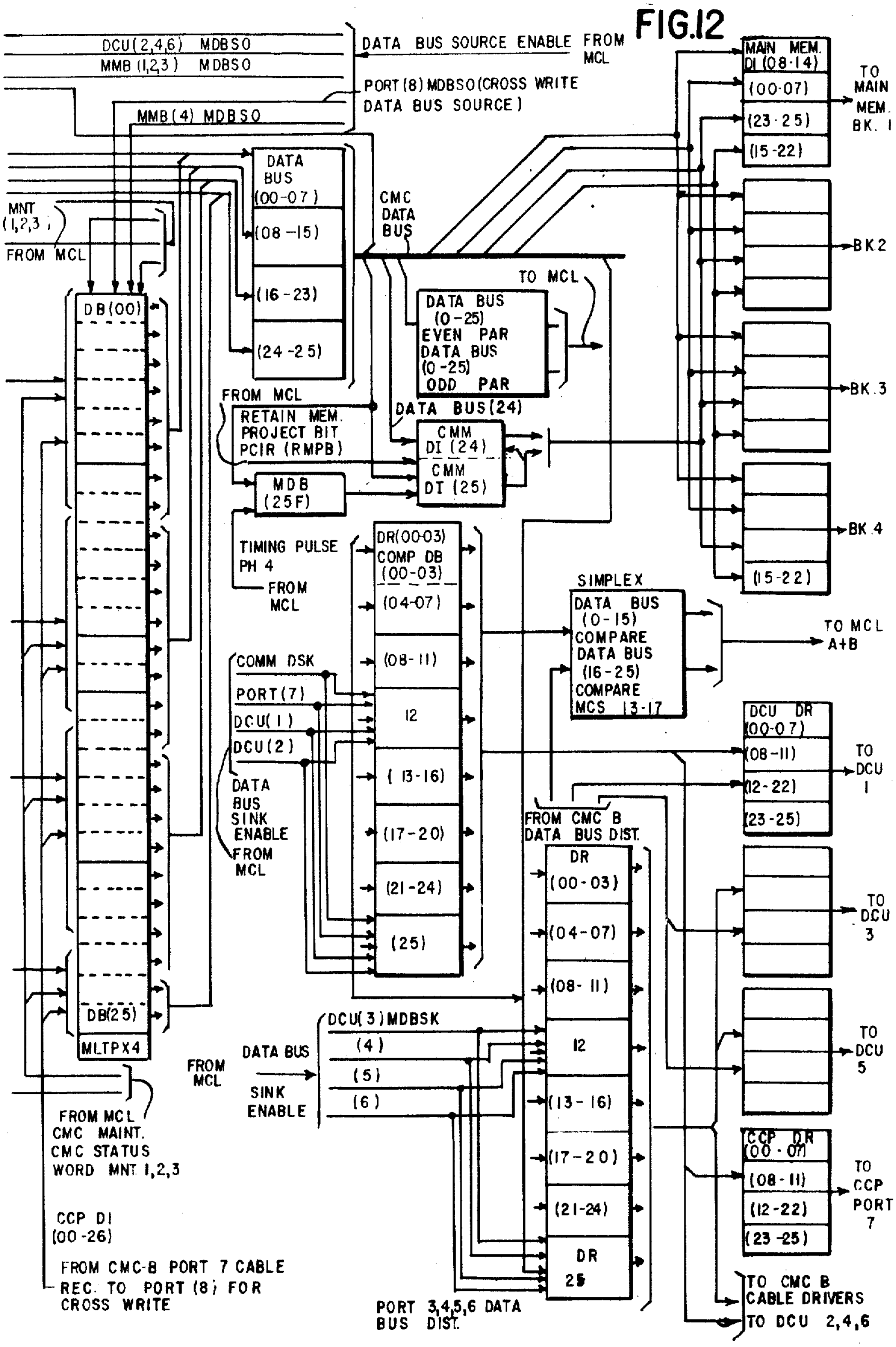
Figure 13:
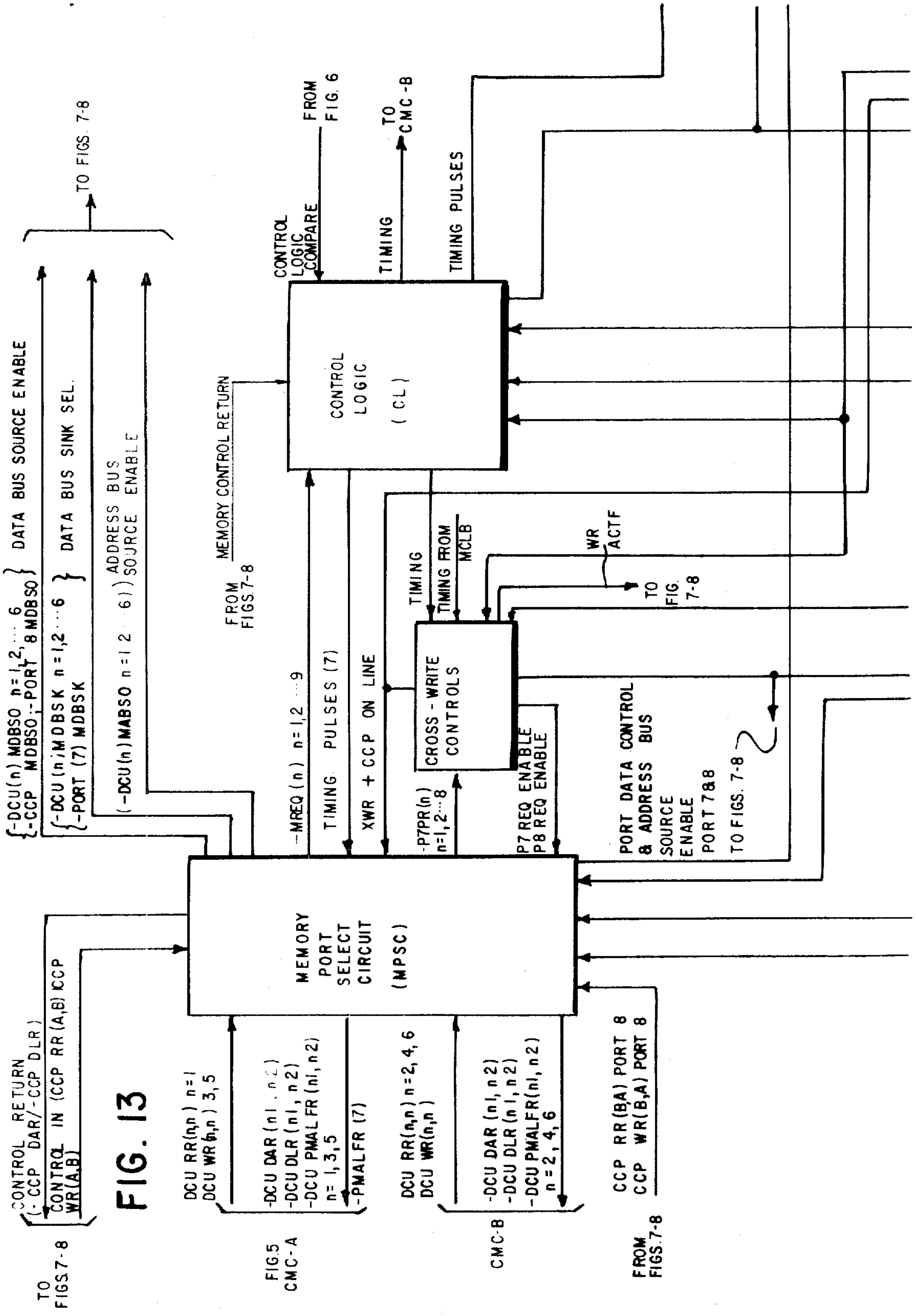
FIGS. 13–16 when arranged as shown in FIG. 23 provide a block diagram of the memory control logic for the system shown in FIG. 1.

FIGS. 11 and 12 when arranged in side by side relationship show the data circuit including the data bus multiplexer 306 (FIG. 11) which permits data from the ports 1–7 of the computer main memory CMM to be gated to the data bus MDB shown in FIG. 12. Also shown in FIG. 12 is the data bus distributor 312 which permits data from the bus MDB to be gated to the ports 1–7.

Figure 14:
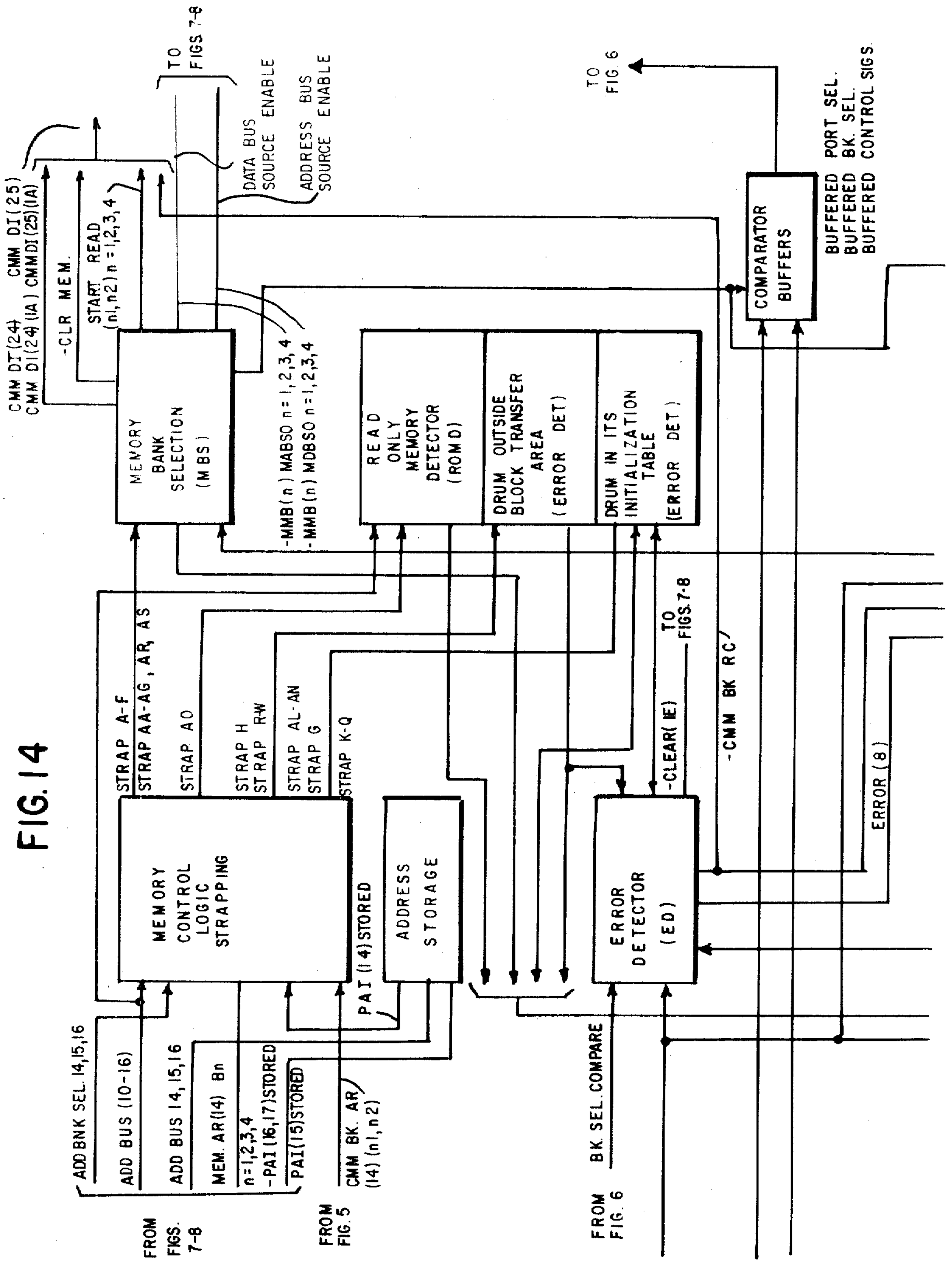
Figure 15:
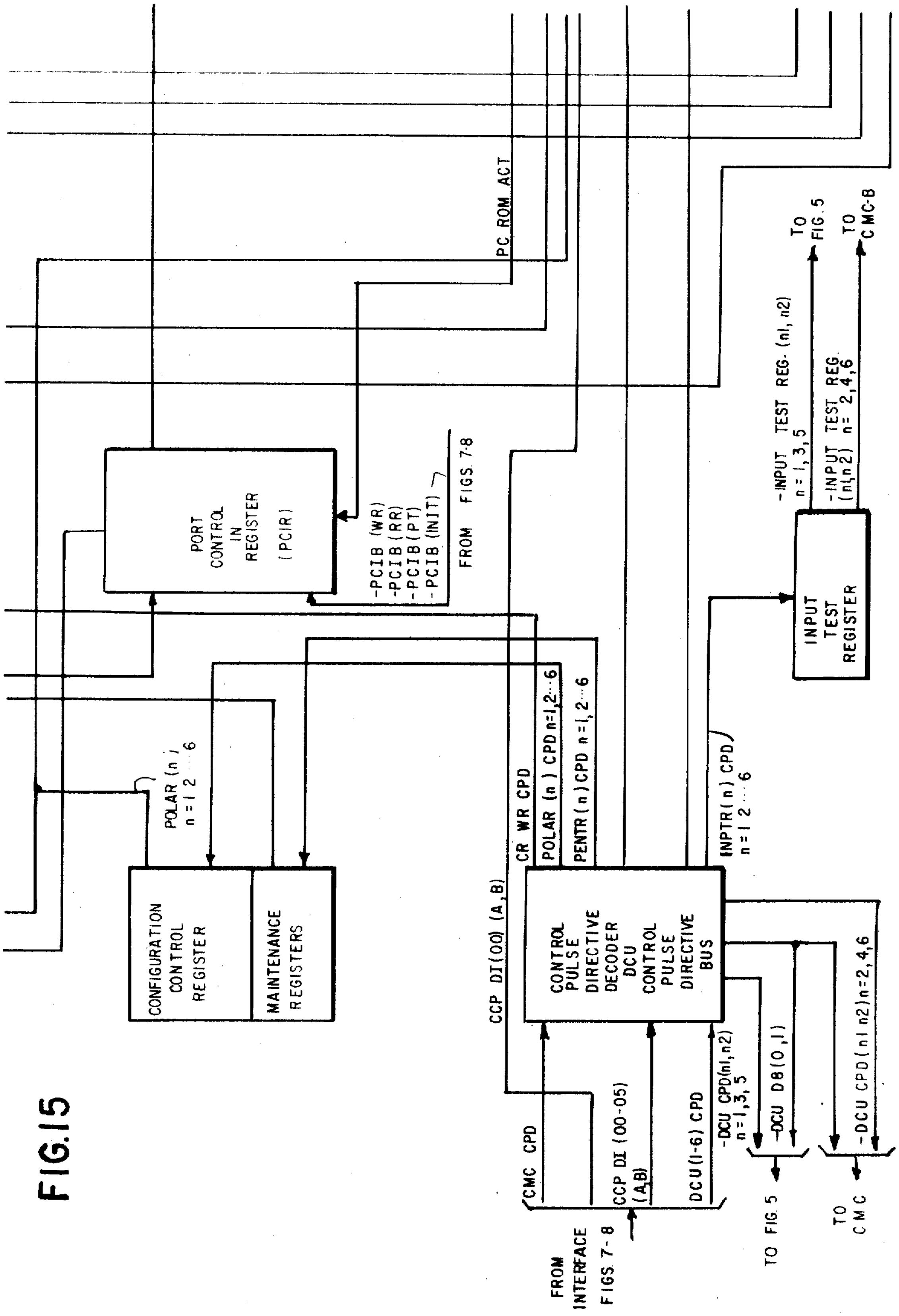
Figure 16:
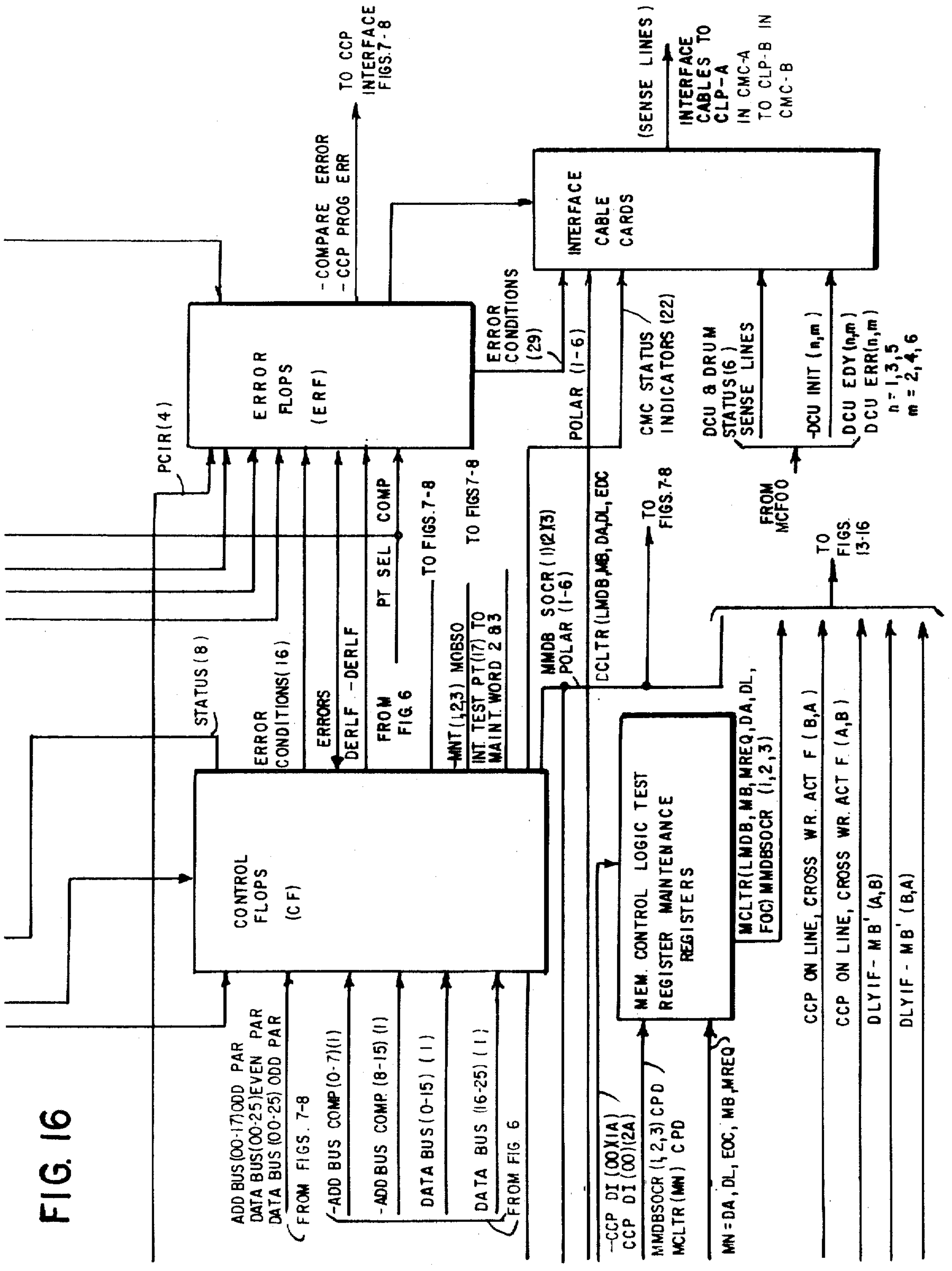
Figures 20, 23, 24, 25:
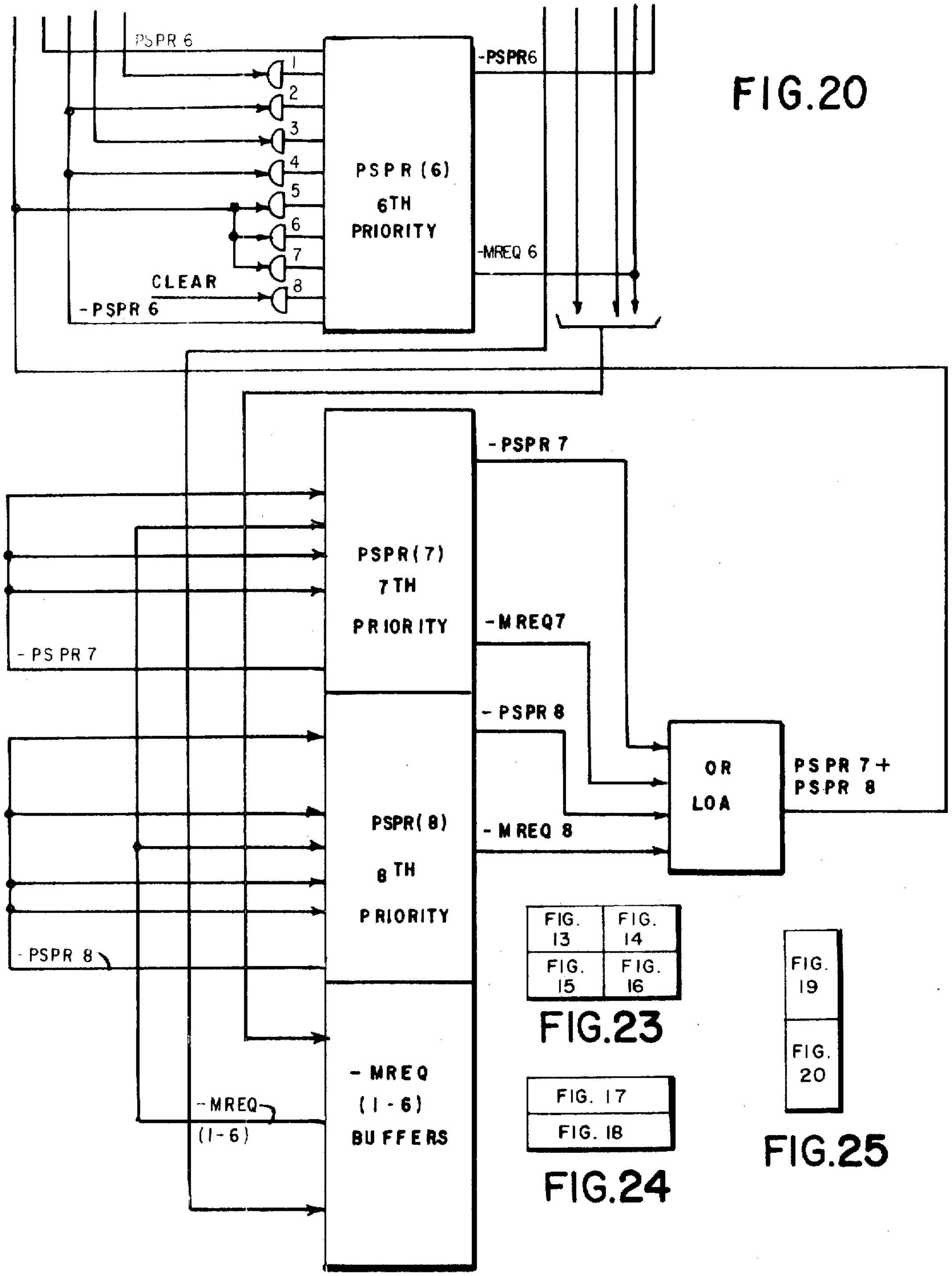
FIG. 23 shows how
FIGS. 24 and 25 show how FIGS. 17, 18 and 19, 20, respectively, are to be arranged.

The memory control logic MCL for computer memory control unit CMCa is shown in FIGS. 13–16 when arranged as shown in FIG. 23. The memory control logic CML includes a memory port select MPSC and control logic CL shown in FIG. 13. The port control in register PCIR is shown in FIG. 15 along with a control pulse directive decoder CPDD which enables central processor commands received from the central processor CCP-A to be gated to the drum control units DCU1-DCU6. FIGS. 14 and 16 show blocks representing the control flip-flops CF, error detector circuits EDC and error flip-flops EF of the memory control logic MCL.

COMPUTER MEMORY CONTROL EQUATIONS

The control functions of the computer memory control logic MCLA (and MCLB) are defined by Boolean algebra equations (1) through (170) listed in Table I.

TABLE I

| | | |
|---|---|---|
| (1) | ABORT WRITE | =–CMM BANK RC·PCIR(WR)·(PH5+PH6·$\overline{\text{DL}}$<br>+ ABORT WRITE·$\overline{\text{REI·CLR}}$ |
| (2) | ACKR(X) | = PSSR(1)·(PH5+PH6)·(PH4'+PH8)+ACKR(X)·<br>ACKR(X) HOLD |
| (3) | ACKR(X) HOLD | = DCU(X)RR+DCU(X)WR)·(POLR(X)·<br>(CCP ON LINE+CROSS WR ACT) +PENTR(X)·<br>CCP ON LINE')<br>X= PORT 1,2,3,4,5,6,9 |
| (4) | ACKR(7) | = PSSR(7)·(PH5+PH6)·(PH4'+PH8)+ACKR(7)·<br>ACKR(7) HOLD |
| (5) | ACKR(7) HOLD | = CCP RR+CCP WR |
| (6) | ACKR(8) | = PSSR(8)·PH5+PH6)·(PH4'+PH8)+ACKR(8)·<br>ACKR(8) HOLD |
| (7) | ACKR(8) HOLD | = CCP RR(B)+CCP WR (B) |
| (8) | AOR | = STRAP A+STRAP B+STRAP C·(STRAP D+STRAP E·<br>STRAP F) |
| (9) | AOREF | = AORF·PH4·DERLF'·ACKRZ+A OREF·(PH4·DERLF'·<br>ACKRZ)'·(REI+CLR)' |
| (10) | AORF | = AOR·PH2+AORF·PH2'·CLR' |
| (11) | BSMR(0) | = [BSR(1)+BSR(3)]·LOAD MR+BSMR(0)·LOAD MR'·<br>REI'·CLR' |
| (12) | BSMR(1) | = [BSR(2)+BSR(3)]·LOAD MR+BSMR(1)·LOAD MR'·<br>REI'·CLR' |
| (13) | BSRCEF | = BSC'·RUN SYNC·PH4·DERLF'·ACKRZ+BSRCEF·<br>(PH4·DERLF'·ACKRZ)'·(REI+CLR)' |
| (14) | BSR(Y) | = BS(Y)·PH3·PH7'+BSR(Y)·(PH3·PH7')'·CLR'<br>Y= MMB BANK NO=1,2,3 |
| (15) | BS(1) | = AOR+STRAP AA·STRAP AB' |
| (16) | BS(2) | = STRAP AB·STRAP AC·AOR' |
| (17) | BS(3) | = STRAP E·STRAP AD·AOR' |
| (18) | BS(4) | = STRAP C·STRAP AG·AOR' |
| (19) | CCP MDBSO | = PSSR(7)·PCIR(WR)·[PH5+PH6]·MNT(123)<br>MDBSO'·RC' |
| (20) | CCP MDBSO | = [PSPR(7)·(PH3+PH4)+PSSR(7)]·PCIR(RR)<br>+CCP ON LINE' |
| (21) | CCP PROG ERR | = PSSR(7)·(AORF+PC ROM ERR+ROMF·PCIR(WR)·<br>ENMP)+CCP PROG ERR·REI'·CLR' |
| (22) | CLR MEM | = CLEAR+CLR MEM·PH1'·MREQ(7)' |
| (23) | COMPARE ERROR | = PSMR(0)·PSMR(1)·PSMR(2)·(PAICEF+PDICEF+<br>SYNCTOF+MARCEF+MDRRCEF+MDRWCEF+BSRCEF+<br>RTRYEF)·CROSS WR ACT' |
| (24) | CROSS WR ACT F(SET) | = CROSS WR F·PHO·DRUM ACC CORE(B)'·<br>PH5(B)'·PH6(B)'·PH0(B) |
| (25) | CROSS WR ACT F(RST) | = CROSS WR F'·DRUM ACC CORE(B)'·PH5(B)'·<br>PH6(B)'·PH0(B)+CCP ON LINE+ CLEAR |
| (26) | DAF | = DA+DAF·EOCSF' |
| (27) | DAR(X1 X2) | [illegible] |

Table 1 – Continued

| | | |
|---|---|---|
| (28) | DAR(7) | = CCP RR·[PSPR(7)·PH4+DAR(7)] |
| (29) | DATA AVAILABLE | = (MMB(1)DA+MMB(2)DA+MMB(3)DA+MMB(4)DA)· TSTCMC'+MCLTR DA(B)·TSTCMC |
| (30) | DATA LOADED | = (MMB(1)DL+MMB(2)DL+MMB(3)DL+MMB(4)DL)· TSTCMC'+MCLTR DL(B)·TSTCMC |
| (31) | DCU(X)MABSO | = PSPR(X)·[PH5+PH5+PH0]' |
| (32) | DCU(X)MDBSK | = (PSPR(X)·(PH3+PH4)+PSSR(X))·PSIR(RR)· CROSS WR ACT F' |
| (33) | DCU(X)MDBSO | = PSSR(X)·PCIR(WR)·[PH5+PH6]·MNT(123) MDBSO'·RC' |
| (34) | DCU(X)PCIBSO | = PSPR(X)·[PH5+PH6+PH0]' |
| (35) | DERLF | = ESF·PH8+DERLF·REI'·CLR' |
| (36) | DIIIT | = (PSPR(1)·STRAP AN'·STRAP AL'·ADD BUS(06) +PSPR(2)·STRAP AM'·STRAP AL·ADD BUS(06)' +PSPR(3)·STRAP AM'·STRAP AL·ADD BUS (06) +PSPR(4)·STRAP AN·STRAP AL'·ADD BUS(06)' +PSPR(5)·STRAP AM·STRAP AL'·ADD BUS(06) +PSPR(6)·STRAP AM·STRAP AL·ADD BUS (06)' ·STRAP G·STRAP K·STRAP L·STRAP M·STRAP N ·STRAP O·STRAP P·STRAP Q |
| (37) | DIIITF | = DIIIT·PH2+DIIITF·PH2'·CLR' |
| (38) | DLR(X1,X2) | = DCU(X)WR·[PSSR(X)·PH7+DLR(X1,X2)] X=DCU UNIT NO.=1,2,3,4,5, OR 6 |
| (39) | DLR(7) | = CCP WR·[PSSR(7)·PH7+DLR(7)] |
| (40) | DLY1F | = DLY1ST·DLY1ST·DLY1'+(PSPR7+PSPR8)·PH5'· PH6'+DLY1F·DLY2'·CLR' |
| (41) | DLY1ST | = [MREQ+TDTST]·DLY2' |
| (42) | DLY1SF | = DLY1+DLY1SF·(MREQ+TDTST)·DLY2'·CLR |
| (43) | DLY2F (SET) | = FALLING EDGE OF DLY2 |
| (44) | DLY2F (RST) | = PH2+CLEAR |
| (45) | DLY2ST | = RTRYF+PH5+DLY1F·TDTST+DLY2 |
| (46) | DLY3ST | =RUN SYNC·CL COMPARE'+TDTST |
| (47) | DOBTA | = (STRAP R·STRAP S·STRAP T·STRAP U· STRAP V·STRAP W)'·PSPR(1)+PSPR (2) +PSPR(3)+PSPR(4)+PSPR(5)+PSPR(6) |
| (48) | DOBTAF | = DOBTA·PH2+DOBTAF·PH2'·CLR |
| (49) | DTEF | = (DIIITF'·PCIR(INIT)+DOBTAF·PCIR(PT)'· DIIITF'·PCIR(WR))·CCP MP STAT·PH4· DERLF'·ACKR(Z)+DTEF·(PH4·DERLF'· ACKR(Z))'·(REI+CLR)' |
| (50) | END OF CYCLE | = (MMF(1)EOC+MMB(2)EOC+MMB(3)EOC+MMB(4) (DC)·TSTCMC'+MCLTR EOC(B)·TSTCMC |
| (51) | ENMP | = ENABLE MEMORY PROTECTION=MPSW |
| (52) | EOCSF | = (END OF CYCLE +CLR)·(EOC(B)+CLR+RUN SYNC')+EOCSF·(END OF CYCLE+CLR+EDC(B)· RUN SYNC) |
| (53) | ERROR INT | = ESF·CCP ON LINE·COMPARE ERR'·CCP PROG ERR' |
| (54) | ESF | = MINVCREF+SYNCTOF+PH4·PTOEF+PH8 (AORF+BSRCEF+DTEF+MARCEF+MARPEF +MDRRCEF+MDRRPEF+MDRWCEF+MDRWPEF +PAICEF+PAIPEF+PDICEF+PDIPEF+PINVCIEF +ROMEF+PC ROMEF+RTRYEF)+ESF·REI'·CLR' |
| (55) | LCH MDB | = PH7·EOCSF+MCLTR(LCH MDB) (B)·CCP ON LINE' |
| (56) | LOAD MR | = DERLF·[PH5+ PH6]·PTOEF' |
| (57) | MAB(XX) | = DCU AI(XX)(1,1)·DCU(1)MABSO+DCU AI(XX) (2,2)·DCU(2)MABSO+DCU AI(XX)(3,3)· DCU(3)MABSO+DCU AI(XX)(4,4)·DCU(4) MABSO+DCU AI(XX)(5,5)·DCU(5)MABSO+DCU AI(XX)(6,6)·DCU(6)MABSO+ +CCP AI(XX)·P7 BUS ENABLE +CCP AI (XX)(B)·P8 BUS ENABLE +MMB(1)AR(XX)· MMB(1)MABSO+MMB(2)AR(XX)·MMB(2)MABSO +MMB(3)AR(XX)·MMB(3)MABSO+MMB(4)AR(XX)· MMB(4)MABSO MMB(Y)AR(NN)=PAI(NN)STORED |
| (58) | MARCEF | = MARCF'·RUN SYNC·PH7·DERLF'+MARCEF· (PH7·DERLF')'·(REI+CLR)' |
| (59) | MARCF (SET) | = ADDRESS BUS(00-17)COMPARE·(PH5+PH6)· (DL·DL(B))' |
| (60) | MARCF (RST) | = ADDRESS BUS(OO-17)COMPAR'·(PH5+PH6)· (DL·DL(B))'+CLR |
| (61) | MARPEF | = MAREPF·PH7·DERLF +MARPEF·(PH7·DERLF)'· (REI+CLR)' |
| (62) | MAREPF | = ADD BUS(OO-17)EVEN PARITY·(PH5+PH6)· DL'+MAREPF·(PH5'·PH6'+DL)·CLR' |
| (63) | MCLTR(C)CPD | = TFC(DB(-5))·CMC CPD NOTE: TFX,TFZ, & TFC ARE FUNCTIONS (BINARY DECODE) OF THE CCP DATA BUS BITS #1 THRU #5 |
| (64) | MCLTR(C) SET | = MCLTR(C)CPD(B,A)·DB(O)(B,A) |
| (65) | MCLTR(C) RST | = MCLTR(C)CPD(B,A)·DB(O)(B,A)'+CLR C= CONTROL BIT=MB,DA,DL,EOC,MREQ OR LCH MDB |
| (66) | MDB(XX) | = DCU DI(XX)(1,1)·DCU(1)MDBSO+DCU DI(XX) (2,2)·DCU(2)MDBSO+DCU DI(XX)(3,3)· DCU(3)MDBSO+DCU DI(XX)(4,4)·DCU(4) MDBSO+DCU DI(XX)(5,5)·DCU(5)MDBSO+DCU DI(XX)(6,6)·DCU(6)MDBSO+ +CCP DI(XX)·CCP MDBSO+CCP DI(XX)(B)· PORT(8)MDBSO+MMB(1)DI(XX)·MMB(1)MDBSO +MMB(2)DI(XX)·MMB(2)MDBSO+MMB(3)DI(XX)· MMB(3)MDBSO+MMB(4)DI(XX)·MMB(4)MDBSO +MNT(1)DB(XX)·MNT(1)MDBSO+MNT(2)DB(XX)· MNT(2)MDBSO+MNT(0)DB(XX)·MNT(3)MDBSO +MDB(XX)·LCH MDB MNT(Y)DB(24)=DATA BUS(0-23,25) EVEN PARITY MNT(Y)DB(25)=EG Y=1.20R3 |

Table I – Continued

| | | |
|---|---|---|
| (67) | MDB(25)F | =DATA BUS (25)·PH4+MDB(25)F·PH2'·CLR' |
| (68) | MDICF (SET) | = DATA BUS(00–25)COMPARE·(PH5+PH6)·(DL·DL(B))' |
| (69) | MDICF (RST) | = DATA BUS(00–25)COMPARE'·(PH5+PH6)·(DL·DL(B))'+CLEAR |
| (70) | MDIEPF | = DATA BUS(00–25)EVEN PARITY·(PH5+PH6)·DL'+MDIEPF·(PH5'·PH6'+DL)·CLR' |
| (71) | MDI(24) | = PCIR(RMPB)'·DATA BUS(24)+PCIR(RMPB)·(DATA BUS(24)·DATA BUS(25)'+DATA BUS (24)'·DATA BUS(25)) |
| (72) | MDI(25) | = PCIR(RMPB)'·DATA BUS(25) |
| (73) | MDRRCEF | = MDRRCF'·RUN SYNC·[PH5+PH6]·DERLF'+MDRRCEF·([PH5+PH6]·DERLF')'·(REI+CLR)' |
| (74) | MDRRCF (SET) | = DATA BUS(00–25)COMPARE·PH4·PH4(B) |
| (75) | MDRRCF (RST) | = DATA BUS(00–25)COMPARE'·PH4·PH4(B)·PCIR(WR)'+CLEAR |
| (76) | MDRREPF (SET) | =DATA BUS(00–25)EVEN PAR·PCIR(RR)·PH4 |
| (77) | MDRREPF (RST) | = DATA BUS(00–25)ODD PAR·PH4+CLEAR +CROSS WR ACT F |
| (78) | MDRRPEF | = MDRREPF·[PH5+PH6]·DERLF'+MDRRPEF·(PH5+PH6·DERLF')'·(REI+CLR)' |
| (79) | MDRWCEF | = MDRWCR'·RUN SYNC·PH7·DERLF'+MDRWCEF·(PH7·DERLF')'·(REI+CLR)' |
| (80) | MDRWCF (SET) | = DATA BUS(00–25)COMPARE·(DL+DL(B)) |
| (81) | MDRWCF (RST) | = DATA BUS(00–25)COMPARE'·(DL+DL(B))+CLEAR |
| (82) | MDRWEPF (SET) | = DATA BUS(00–25)EVEN PAR·PH7 |
| (83) | MDRWEPF (RST) | = DATA BUS(00–25)ODD PAR·PH7+CROSS WR ACT F+CLEAR |
| (84) | MDRWPEF | = MDRWEPF·PH7·DERLF'+MDRWPEF·(PH6·DERLF')'·(REI+CLR)' |
| (85) | MEMORY BUSY | = (MMB(1)MB+MMB(2)MB+MMB(3)MB+MMB(4)MB)·TSTCMC'+MCLTR MB(B)·TSTCMC |
| (86) | MINVCRB | = MB'·DA+F4·DA+F1·MB'+F2·F1'·DA+F3·F2·F1·DA'+F4·F3'·F2'·MB+F4·F3'·F1'·DL'<br>F1=[F1·DL'+F2'·MB]·CLR'<br>F2=[DA+MB·F2]·CLR'<br>F3 =EOC·CLR'<br>F4=[F4·F3'+DL+F2·F1·DA']·CLR' |
| (87) | MINVCREF | = MINVCRB·DERLF'+(REI+CLR)'·MINVCREF |
| (88) | MMB(Y)MABSO | = BSR(Y)·[PH5+PH6+PHO] |
| (89) | MMB(Y)MDBSO | = BSR(Y)·[RC+(PH5+PH6)']·MNT(123)MDBSO' |
| (90) | MMDBSCR(Z)CPD | = TFZ(DB1–5))·CMC CPD<br>NOTE: TFX,TFZ, &TFC ARE FUNCTIONS (BINARY DECODE) OF THE CCP DATA BUS BITS #1 THRU #5 |
| (91) | MMDBSOCCR(Z)RST | =MMDBSPCR(Z)CPD·DB(0)'+CLR |
| (92) | MMDBSOCR(Z)SET | =MMDBSOCR(Z)CPD·DB(0) |
| (93) | MNT(Z)MDBSO | = CCP ON LINE'·MMDBSOCR(Z)(B)<br>Z=1,2 OR 3 |
| (94) | MREQ | = [MREQ(1)+MREQ(2)+MREQ(3)+MREQ(4)+MREQ(5)+MREQ(6)+MREQ(7)+MREQ(8)+MREQ(9)]·TSTCMC'+MCLTR(MREQ)·TSTCMC |
| (95) | MREQ(7) | = (P7 RR+P7 WR)·ACKR(7)'·CROSS WRITE ACTIVE'·DRUM ACC CORE ·PH5'·PH6' |
| (97) | MREQ(8) | = (P8 RR+P8 WR)·ACKR(8)'·CROSS WRITE ACTIVE·DRUM ACC CORE'·PH5'·PH6' |
| (98) | PAICEF | = PAICF'·RUN SYNC·PH4·DERLF'·ACKRZ+PAICEF·(PH4·DERLF'·ACKRZ)'·(REI+CLR)' |
| (99) | PAICF | = ADD BUS(00–17)COMPARE·PH3+PAICF·PH3'·CLR' |
| (100) | PAIEPF | =ADD BUS(00–17)EVEN PARITY·PH3+PAIEPF·PH3'·CLR' |
| (101) | PAIPEF | = PAIEPF·PH4·DERLF'·ACKRZ+PAIPEF·(PH4·DERLF'·ACKRZ)'·(REI+CLR)' |
| (102) | PAI(NN)STORED | =ADD BUS(NN)·PH2+PAI(NN)STORED·PH2'·CLR'<br>NN= 16,15 OR 14 |
| (103) | PAI(17)F | =ADD BUS(17)·PH2+PAI(17)F·PH2'·CLR' |
| (104) | PCIB(INIT) | = DCU(1)INIT·DCU(1)PCIBSO+DCU(2)INIT·DUC(2)PCIBSO+DCU(3)INIT·DCU(3)PCIBSO+DCU(4)INIT·DCU(4)PCIBSO+DCU(5)INIT·DCU(5)PCIBSO+DCU(6)INIT·DCU(6)PCIBSO |
| (105) | PCIB(PT) | = DCU(1)PT·DCU(1)PCIBSO+DCU(2)PT·DCU(2)PCIBSO+DCU(3)PT·DCU(3)PCIBSO+DCU(4)PT·DCU(4)PCIBSO+DCU(5)PT·DCU(5)PCIBSO+DCU(6)PT·DCU(6)PCIBSO+PC ROM ACT'·(P7 BUS ENABLE +P8 BUS ENABLE) |
| (106) | PCIB(RMPB) | = PC ROM ACT·P7BUS ENABLE |
| (107) | PCIB(RR) | = DCU(1)RR·DCU(1)PCIBSO+DCU(2)RR·DCU(2)PCIBSO+DCU(3)RR·DCU(3)PCIBSO+DCU(4)RR·DCU(4)PCIBSO+DCU(5)RR·DCU(5)PCIBSO+DCU(6)RR·DCU(6)PCIBSO+CCP RR·P7 BUS ENABLE +CCP RR(B)·P8 BUS ENABLE |
| (108) | PCIB(WR) | = DCU(1)WR·DCU(1)PCIBSO+DCU(2)WR·DCU(2)PCIBSO+DCU(3)WR·DCU(3)PCIBSO+DCU(4)WR·DCU(4)PCIBSO+DCU(5)WR ·DCU(5)PCIBSO +DCU(6)WR·DCU(6)PCIBSO+CCP WR·P7 BUS ENABLE+CCP WR(B)·P8 BUS ENABLE |
| (109) | PCIMR(Z) | = PCIR(Z)·LOAD MR+PCIMR(Z)·LOAD MR'·REI'·CLR'<br>Z=CONTROL BIT=RR,WR,PT,RMPB, OR INIT |
| (110) | PCIR(Z) | = PCIB(Z)·PH3..PH7'+PCIR(Z)·(PH3·PH7')'·CLR'<br>Z= CONTROL BIT=RR,WR,PT,RMPB,OR INIT |
| (111) | PC ROMEF | = PC ROM ERR·ERR·PH4·DERLF'·ACKR(Z)+PC ROMEF·(PH4·DERLF'·ACKR(Z))'·(REI+CLR)' |

Table I – Continued

| | | |
|---|---|---|
| (112) | PC ROM ERR | = CCP MP STAT·PCIR(WR)·PCIR(PT)'·(PSSR(7)+PSSR(8))·MDB(25)F |
| (113) | PDICEF | = MDICF'·PCIR(WR)·RUN SYNC·PH7·DERLF' +PDICEF·(PH7·DERLF')'·(REI+CLR)' |
| (114) | PDIPEF | = MDIEPF·PCIR(WR)·PH7·DERLF'+PDIPEF·(PH7·DERLF')'·(REI+CLR)' |
| (115) | PENTR(X)(A,B)RST | = PENTR(X)CPD·DB(0)'+CLR |
| (116) | PENTR(X)(A,B)SET | = PENTR(X)CPD·DB(0) |
| | | X= DCU UNIT NO=DCU PORT NO=1,2,3,4,5, OR 6 |
| (117) | PENTR(X)CPD | = TFX(DB(1-5))·CMC CPD |
| (118) | PH1E | = SYNCTOF+RTRYR(0)·RTRYR(1)·PSPRC' |
| (119) | PH2E+PH3E+PH4E | = SYNCTOF+AORF+(ROMF·PCIR(WR)·ENMP)+DRUM TABLE ERR +PINVCIR+MDRREPF+RUN SYNC·(BSR COMPARE'+MDRRCF'+PAICF') |
| (120) | PH5E+PH6E+PH7E | = SYNCTOF+MDIEPF+MDRWEPF+MAREPF+PC ROM ERR +RUN SYNC·(MARCF'+MDRWCF' +MDICF'·PCIR(WR)) |
| (121) | PH0 | = MREQ'·MB'·EOCSF' |
| (122) | PH1 | = MREQ·PH2'·PH3'·PH4'·PH5' |
| (123) | PH2 | = START READ1+STARTREAD2+START READ3+STARTREAD4+DLY1F·MB'·(RUN SYNC+RTRYR(0)·RTRYR(1)) |
| (124) | PH3 | = MB·DAF ·DLY2F' |
| (125) | PH4 | = DA |
| (126) | PH5 | = DA'·DAF·DLY2F' |
| (127) | PH6 | = DLY2F·DAF·PH7' |
| (128) | PH7 | = DL·[DL(B)+RUN SYNC']+PH7[DL+DL(B)·RUN SYNC] |
| (129) | PH8 | = EOCSF·PH7' |
| (130) | PH3+PH4 | = MB·(PH5+PH6)'·DLY2F' |
| (131) | PINVCIEF | = [PCIR(RR)'·PCIR(WR)'+PCIR(RR)·PCIR(WR)]·PH4·DERLF'·ACKRZ+PINVCIEF·(PH4·DERLF'·ACKRZ)'·(REI+CLR)' |
| (132) | PMALFR(V)RST | = REI+CLR |
| (133) | PMALFR(V)SET | = PSPR(V)·PH1E·PH3+PSSR(V)·[PH2E+PH3E +PH4E]·PH6+PSSR(V) ·[PH5E+PH+E+ PH7E]·PH8+ACKR(V)·PH4·PH8' |
| | | V= PORT NO=7,8, OR 9 |
| (134) | PMALFR(X1,X2)RST | = REI+CLR |
| (135) | PMALFR(X1,X2)SET | = PSPR(X)·PH1E·PH3+PSSR(X)·[PH2E+PH3E+ PH4E]·PH6+PSSR(X)·[PH5E+PH6E+PH7E]·PH8+ACKR(X)· PH4·PH8' |
| | | X= DCU UNIT NO=DCU PORT NO=1,2,3,4,5, OR 6 |
| (136) | POLR(X)CPD | = TFX(DB(1-5))·CMC CPD |
| | | X=DCU NO=1-6 |
| (137) | POLR(X)RST | = POLR(X)CPD·DB(0)'+CLR |
| (138) | POLR(X)SET | = POLR(X)CPD·DB(0) |
| (139) | PORT (8)MDBSO | = PSSR(8)·PCIR(WR)·(PH5+PH6)·MNT(123)·MDBSO'·RC' |
| (140) | PSMR(0) | = [PSSR(1)+PSSR(3)+PSSR(5)+PSSR(7)+PSSR(9)]·LOAD MR+PSMR(0)·LOAD MR'·REI'·CLR' |
| (141) | PSMR(1) | = [PSSR(2)+PSSR(3)+PSSR(6)+PSSR(7)]·LOAD MR+PSMR(1)·LOAD MR'·REI'·CLR' |
| (142) | PSMR(2) | = [PSSR(4)+PSSR(5)+PSSR(6)+PSSR(7)]·LOAD MR+PSMR(2)·LOAD MR'·REI'·CLR' |
| (143) | PSMR(3) | = [PSSR(8)+PSSR(9)]·LOAD MR+PSMR(3)·LOAD MR'·REI'·CLR' |
| (144) | PSPR(1) | = (MREQ(1)·PH3'·PH4'+PSPR(1))·PSPR(2)'·PSPR(3)'·PSPR(4)'·PSPR(5)'·PSPR(6)'·PSPR(8)'·PSPR(7)'·PSPR(9)'·RST PSPR' |
| (145) | PSPR(2) | = (MREQ(2)·PH3'·PH4'·MREQ(1)'+PSPR(2))·PSPR(3)'·PSPR(4)'·PSPR(5)'·PSPR(6)'·PSPR(8)'·PSPR(7)'·PSPR(9)'·RST PSPR' |
| (146) | PSPR(3) | = (MREQ(3)·PH3'·PH4'·MREQ(1)'·MREQ(2)' +PSPR(3))·PSPR(4)'·PSPR(5)'·PSPR(6)' PSPR(8)'·PSPR(7)'·PSPR(9)'·RST PSPR |
| (147) | PSPR(4) | = (MREQ(4)· PH3'·PH4'·MREQ(1)'·MREQ(2)'·MREQ(3)'+PSPR(4))·PSPR(5)'·PSPR(6)' PSPR(8)'·PSPR(7)'·PSPR(9)'·RST PSPR |
| (148) | PSPR(5) | = (MREQ(5)·PH3'·PH4'·MREQ(1)'·MREQ(2)'·MREQ(3)'·MREQ(4)'+PSPR(5))·PSPR(6)'·PSPR(7)'·PSPR(8)'·PSPR(9)'·RST PSPR' |
| (149) | PSPR(6) | = (MREQ(6)·PH3'·PH4'·MREQ(1)'·MREQ(2)'·MREQ(3)'·MREQ(4)'·MREQ(5)'+PSPR(6))·PSPR(7)'·PSPR(8)'·PSPR(9)'·RST PSPR' |
| (150) | PSPR(7) | = (MREQ(7)·PH3'·PH4'·MREQ(1)'·MREQ(2)'·MREQ(3)'·MREQ(4)'·MREQ(5)'·MREQ(6)' +PSPR(7))·PSPR(8)'·PSPR(9)'·RST PSPR' |
| (151) | PSPR(8) | = (MREQ(8)·PH3' ·PH4'·MREQ(1)'·MREQ(2)'·MREQ(3)'·MREQ(4)'·MREQ(5)'·MREQ(6)' ·MREQ(7)'+PSPR(8))·PSPR(9)'·RST PSPR' |
| (152) | PSPR(9) | = (MREQ(9)·PH3'·PH4'·MREQ(1)'·MREQ(2)' ·MREQ(3)'·MREQ(4)'·MREQ(5)'·MREQ(6)' ·MREQ(7)'·MREQ(8)'+PSPR(9))·RST PSPR' |
| (153) | PSSR(W) | = PSPR(W)·PH4·PH8'+PSSR(W)·(PH4·PH8')'·CLR' |
| | | W= PORT NO=1,2,3,4,5,6,7,8, OR 9 |
| (154) | PTOEF | = ACK(Z)·PH4·PH8'+PHOEF·REI'·CLR' |
| (155) | P7 BUS ENABLE | = (PSPR(7)+PSPR(8)+DRUM ACC CORE')·CROSS WR ACT F'·PH5'·PH6' |
| (156) | P8 BUS ENABLE | = (PSPR(7)+PSPR(8)+DRUM ACC CORE')·CROSS WR ACT F·PH5'·PH6' |
| (157) | READ ONLY MEMORY | = ADD BUS (14)'·AD BUS(13)'·ADD BUS(12)' ·ADD BUS(11)'·ADD BUS(1)'·STRAP AO |

Table I – Continued

| | | |
|---|---|---|
| (158) | RESTORE CONTROL | = PCIR(RR)+PINVCIR+ ROMF·ENMP·PCIR(WR) +PC ROM ERR+DRUM TABLE ERR+A ORF+RTRY3F +(BSR COMPARE'+PAICF)·RUN SYNC+PAIEPF |
| (159) | RMWC | = 1 |
| (160) | ROMEF | = ROMF·PCIR(WR)·PH4·DERLF'·ACKRZ·ENMP +ROMEF·(PH4·DERLF'·ACKRZ)'·(REI+CLR)' |
| (161) | ROMF | = ROM·PH2+ROMF·PH2'·CLR' |
| (162) | RST PSPR | = (DLY2+CLR)(PH4'+PH8) |
| (163) | RTRYEF | = RTRYR3F·PH4'DERLF'·ACKRZ+RTRYEF· (PH4·DERLF'·ACKRZ)'·(REI+CLR)' |
| (164) | RTRYF | = DLY1F·MB'·DLY1F(B)·MB(B)'·PSPRC' ·(RTRYR(0)·RTRYR(1))'·RUN SYNC+RTRYF·DLY' ·CLR' |
| (165) | RTRY3F | = RTRYR(0)·RTRYR(1)·PSPRC'·PH2+RTRY3F· PH2'·CLR |
| (166) | RUN SYNC | = (CCP ON LINE+CROSS WRITE ACTIVE FF)· (CCP ON LINE(8)+CROSS WRITE ACTIVE(B))· SYNCTOF' CROSS WRITE ACTIVE·CROSS WRITE ACTIVE(B)= LOGIC 0 |
| (167) | START READ(Y) | = BS(Y)·DLY1F·MB'·DLY1F·MB(B)'·PSPR COMPARE·RUN SYNC+BS(Y)·DLY1F·MB'· TSTCMC'·(START READ(Y)+RUN SYNC' +RTRYR(0)·RTRYR(1)) Y= MAIN MEMORY BANK 1,2,3, OR 4 |
| (168) | SW | = 0 |
| (169) | SYNCTOF | = DLY3ST·DLY3'+SYNCTOF·REI'·CLR' |
| (170) | TSTCMC | = (MCLTR MREQ(B)+MCLTR MB(B)+MCLTR DA(B)+MCLTR DL(B)+MCLTR EOC(B))·CCP ON LINE' |

The equations (1)-(170) can be implemented by known circuits in a manner which would be apparent to one skilled in the art. Mneumonics used in equations (1)-(170) are defined in Table II.

TABLE II

| | | |
|---|---|---|
| AOR | ADDRESS OUT OF RANGE | 060 |
| AOREF | ADDRESS OUT OF RANGE ERROR FLOP | 140 |
| AORF | ADDRESS OUT OF RANGE FLOP | 110 |
| ACKR | PORT ACKNOWLEDGE REGISTER | 150 |
| BS(1) | BANK SELECT (1) | 130 |
| BSMR | BANK SELECTED MALFUNCTION REGISTER | |
| BSR | BANK SELECT REGISTER | 140 |
| BSRCEF | BANK SELECT REGISTER COMPARISON ERROR FLOP | |
| BSC | BANK SELECT REGISTER COMPARE | 050 |
| CCP PROG | COMPUTER CENTRAL PROCESSOR | |
| ERR | PROGRAM ERROR | 090 |
| DAF | DATA AVAILABLE FLOP | 080 |
| DAR | PORT DATA AVAILABLE REGISTER | 160 |
| DERLF | DISABLE ERROR REGISTER LOAD FLOP | 050 |
| DIIIT | DRUM IN ITS INITIALIZATION TABLE | 140 |
| DIIITF | DRUM IN ITS INITIALIZATION TABLE FLOP | 130 |
| DLR | PORT DATA LOADED REGISTER | 170 |
| DLY1F | DELAY 1 FLOP | 010 |
| DLY1SF | DELAY 1 SECONDARY FLOP | 020 |
| DLY2F | DELAY 2 FLOP | 030 |
| DLY3SF | DELAY 3 SECONDARY FLOP | 200 |
| DOBTA | DRUM OUTSIDE BLOCK TRANSFER AREA | 150 |
| DOBTAF | DRUM OUTSIDE BLOCK TRANSFER AREA FLOP | 140 |
| DT | DRUM TABLE | 090 |
| DTEF | DRUM TABLE ERROR FLOP | 170 |
| ENMP | CCP MP STAT | |
| EOCSF | END OF CYCLE SYNC FLOP | 090 |
| ESF | ERROR STORED IN ERROR REGISTER FLOP | 060 |
| MINVCREF | MEMORY INVALID CONTROL RETURN ERROR FLOP | |
| MAB | MEMORY ADDRESS BUS | |
| MAB(0-15) CMP | MEMORY ADDRESS BUS (BITS 0-15) COMPARE | 020 |
| MABSO | MEMORY DATA BUS SOURCE ENABLE | |
| MARCEF | MEMORY ADDRESS RETURN COMPARISON ERROR FLOP | 040 |
| MARCF | MEMORY ADDRESS RETURN COMPARISON FLOP | 190 |
| MAREPF | MEMORY ADDRESS RETURN EVEN PARITY | 180 |
| MARPEF | MEMROY ADDRESS RETURN PARITY ERROR FLOP | 100 |
| MCLTR | MEMROY CONTROL LOGIC TEST REGISTER | |
| MDB | MEMORY DATA BUS | 010 |
| MDBSO | MEMORY DATA BUS SOURCE ENABLE | |

TABLE II – Continued

| | | |
|---|---|---|
| MDBSK | MEMORY DATA BUS SINK ENABLE | |
| MDB(0-15) CMP | MEMORY DATA BUS (BITS 0-15) COMPARE | 030 |
| MDB(25)F | MEMORY DATA BUS (BIT 25) FLOP | 080 |
| MDICF | MEMORY DATA IN COMPARE FLOP | |
| MDIEPF | MEMORY DATA IN EVEN PARITY FLOP | |
| MDRRCEF | MEMORY DATA RETURN READ COMPARISON ERROR FLOP | 050 |
| MDRRCF | MEMORY DATA RETURN READ COMPARE FLOP | |
| MDRREPF | MEMORY DATA RETURN READ EVEN PARITY FLOP | |
| MDRRPEF | MEMORY DATA RETURN READ PARITY ERROR FLOP | 110 |
| MDRWCEF | MEMORY DATA RETURN WRITE COMPARISON ERROR FLOP | 070 |
| MDRWPEF | MEMORY DATA RETURN WRITE PARITY ERROR FLOP | 130 |
| MDRWCF | MEMORY DATA RETURN WRITE COMPARE FLOP | 020 |
| MDRWEPF | MEMORY DATA RETURN WRITE EVEN PARITY FLOP | 010 |
| MINVCRB | MEMORY INVALID CONTROL RETURN BUS | 110 |
| MMB(1)SRF | MAIN MEMORY BANK 1 START READ FLOP | 040 |
| MMB(2)SRF | MAIN MEMORY BANK 2 START READ FLOP | 050 |
| MMB(3)SRF | MAIN MEMORY BANK 3 START READ FLOP | 060 |
| MMB(4)SRF | MAIN MEMORY BANK 4 START READ FLOP | |
| MR | MALFUNCTION REGISTER | |
| MREQ | MEMORY REQUEST (READ REQUEST OR WRITE REQUEST) | |
| MMDBSOCR | MAINTENANCE MEMORY DATA BUS SOURCE CONTROL REGISTER | 010 |
| PAI(17)F | PORT ADDRESS IN PARITY FLOP | |
| PAICEF | PORT ADDRESS IN COMPARISON ERROR FLOP | 030 |
| PAICF | PORT ADDRESS IN COMPARE FLOP | 170 |
| PAIEPF | PORT ADDRESS IN EVEN PARITY FLOP | |
| PAIPEF | PORT ADDRESS IN PARITY ERROR FLOP | 090 |
| PCIB | PORT CONTROL IN BUS | |
| PCIBSO | PORT CONTROL IN BUS SOURCE ENABLE | |
| PCIMR | PORT CONTROL IN MALFUNCTION REGISTER | 200 |
| PCIR | PORT CONTROL IN REGISTER | 130 |
| PCROMEF | PROGRAM CONTROLLED READ ONLY MEMORY ERROR FLOP | |
| PDICEF | PORT DATA IN COMPARISON ERROR FLOP | 060 |
| PDIPEF | PORT DATA IN PARITY ERROR FLOP | 120 |
| PENTR | PORT ENABLE TEST REGISTER | |

TABLE II-Continued

| | | |
|---|---|---|
| PH1E | PHASE 1 ERROR | 160 |
| PH7 | PHASE 7 | 070 |
| PINVCIEF | PORT INVALID CONTROL IN ERROR FLOP | |
| PINVCIR | PORT INVALID CONTROL IN REGISTER | |
| PMALFR | PORT MALFUNCTION INDICATION REGISTER | |
| POLR | PORT ON LINE REGISTER | 020 |
| PSMR | PORT SELECTED MALFUNCTION REGISTER | 190 |
| PSPR | PORT SELECT PRIMARY REGISTER | 110 |
| PSPRC | PORT SELECT PRIMARY REGISTER COMPARE | |
| PSSR | PORT SELECT SECONDARY REGISTER | 120 |
| PTOEF | PORT TIME OUT ERROR FLOP | 120 |
| P7 | PORT SEVEN | |
| P8 | PORT EIGHT | |
| RMWC | READ/MODIFY/WRITE CONTROL | |
| ROM | READ ONLY MEMORY | 070 |
| ROMEF | READ ONLY MEMORY ERROR FLOP | 150 |
| ROMF | READ ONLY MEMORY FLOP | 120 |
| RST | RESET | |
| RTRYF | RETRY FLOP | 100 |
| RTRYEF | PORT SELECT RETRY ERROR FLOP | 200 |
| RTRY3F | THREE PORT SELECT RETRIES | 070 |
| RTRYR | RETRY REGISTER | 180 |
| SYNCTOF | SYNCHRONISM TIME OUT FLOP | |
| SW | START WRITE | |
| TSTCMC | TEST CMC | |

Inputs are supplied to the computer memory control logic MCL-A over the port IN control bus (FIG. 3) via the port control IN multiplexer 307 and extended to the port in control register PICR (FIG. 15). These inputs include -PCIB(RR) read command (equation 107), -PCIB(WR), write command (equation 108), -PCIB(PT) privileged transfer (equation 105) and -PCIB(INIT) drum addressing its initialization table (equation 104), and memory request MREQ (equations 94–96).

Further inputs, MEMORY BUSY (equation 85), DATA AVAILABLE (equation 29), DATA LOADED (equation 30) and END OF CYCLE (equation 50) are extended to the memory control logic MCL-A from the memory clock via the memory control return over multiplex circuit 314 (FIG. 8).

In addition to generating a number of internal command and timing signals included in equations (1) through (170), the computer memory control logic MCL-A provides twenty-nine error outputs via sense lines connected to outputs of the error flip-flops ERF (FIG. 16). The various error outputs are indicated in the following detailed operational description.

Operational Description of Computer Memory Control

A typical memory access cycle for the computer memory control unit CMC-A will now be described with reference to FIGS. 3, 10 and 13–20, along with the timing diagrams shown in FIGS. 21 and 22. Each memory cycle is comprised of eight phases PH1-PH8. In addition, when no memory requests are being processed, the memory control logic MCL-A is in an idle condition, phase PHO.

Phase PHO — The Idle Condition

Referring to FIG. 3, in the idle condition, phase PHO, (eq. 121) bus connections held from the previous memory cycle are: the memory address bus MAB is connected from the last memory bank accessed over the bank selector circuit BS; the memory data bus MDB is connected from the last bank accessed to the last port accessed. These connections are held by bank select register BSR and the port select register PS and the port select register PS is waiting for a memory request from one of the ports 1–7.

The central processor CCP-A is preselected as the address bus source at the end of each memory request and remains preselected until a memory request is provided to the computer memory control CMC-A. This enables accelerated access to the main memory CMM by central processor CCP-A.

Phase PH1 — Memory Request Recognition and Selection

Figure 19:
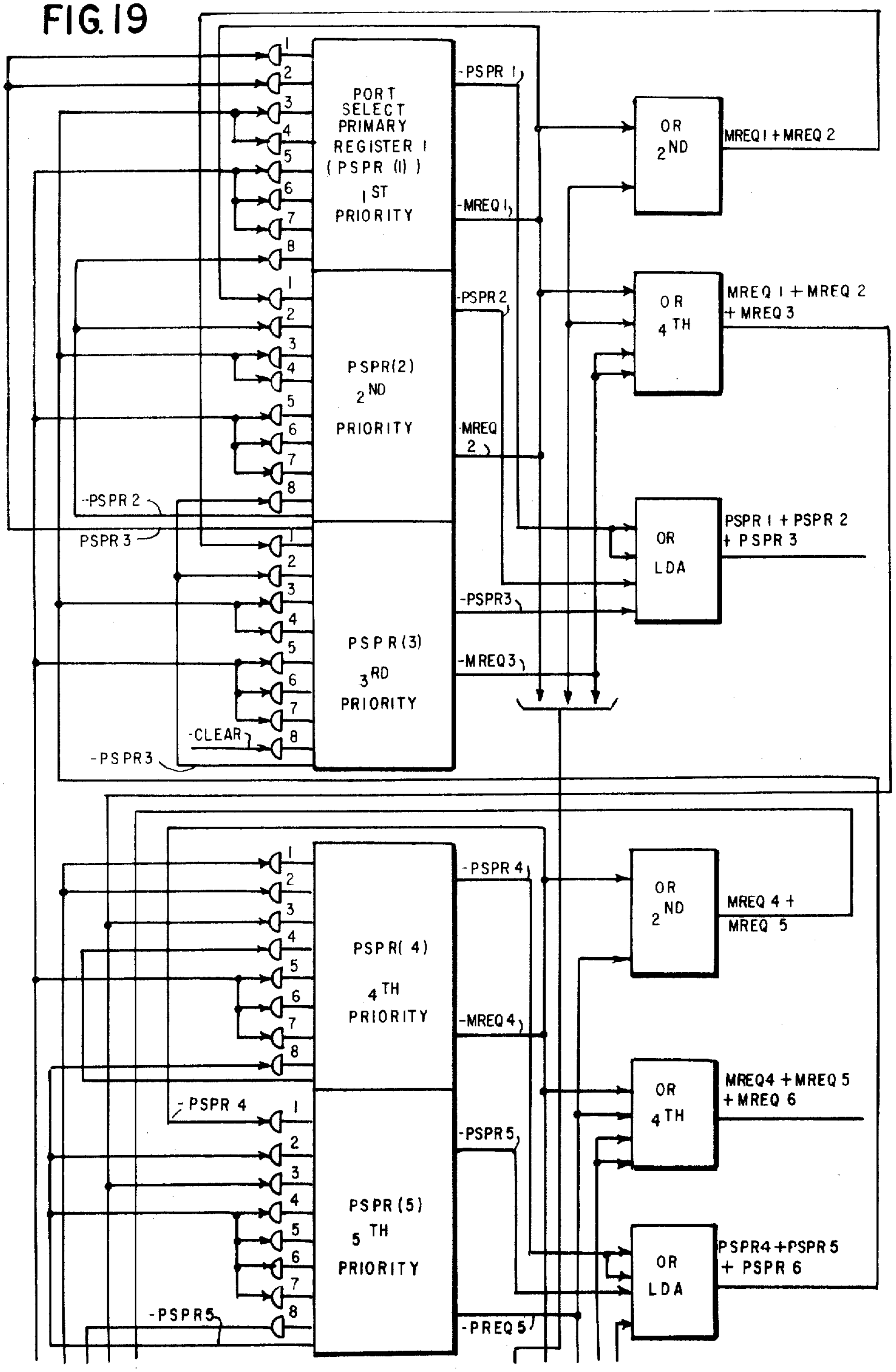
FIGS. 19 and 20 show the port select primary registers for the port select circuit shown in FIGS. 17 and 18.

When a memory request is provided at one of the ports (1–7), the control input provided by the drum control unit DCU(1–6) or the central processor CCP-A providing the memory request is extended over the associated interface cable 301–304 to the port select register PS. Referring to FIGS. 19 and 20, the port select register PS includes seven port select primary registers PSPR(1–7), each individually associated with a different one of the ports (1–7). In addition, an eighth port select primary register PSPR(8) is provided for the duplicated central processor CCP-B. Each register PSPR has eight inhibit inputs (1–8). The inhibit inputs (1–8) of the registers PSPR(1–8) are interconnected as shown in FIGS. 19 and 20 to permit selection of a port on a priority basis in the event of simultaneous memory requests from more than one of the ports (1–7). Port 1 has the highest priority, register, PSPR1, port 2 has the next highest priority, register PSPR2, and so on to port 7, register PSPR7, which is assigned to the central processor CCP-A. The central processor CCP-A has the lowest priority to enable the drum control units DCU(1–6) to access the computer main memory CMM when the data is available from the associated drum. Register PSPR8 is used to enable the central processor CCP-B to access the computer main memory CMM-A during the crosswrite operation.

When one of the registers PSPR (1–7) is loaded, the remaining ones of the registers PSPR(1–7) are inhibited. In addition, during port select, if an input is supplied to a higher priority register PSPR, the lower priority registers PSPR are inhibited so that the port associated with the higher priority register PSPR will be selected. However, when service of one memory request is completed another memory request is answered. The next request to be serviced is always the one of the next highest priority in the queue. The port selection to determine which request is answered is made while the previous request is being completed as will be described in more detail hereinafter.

Figure 17:
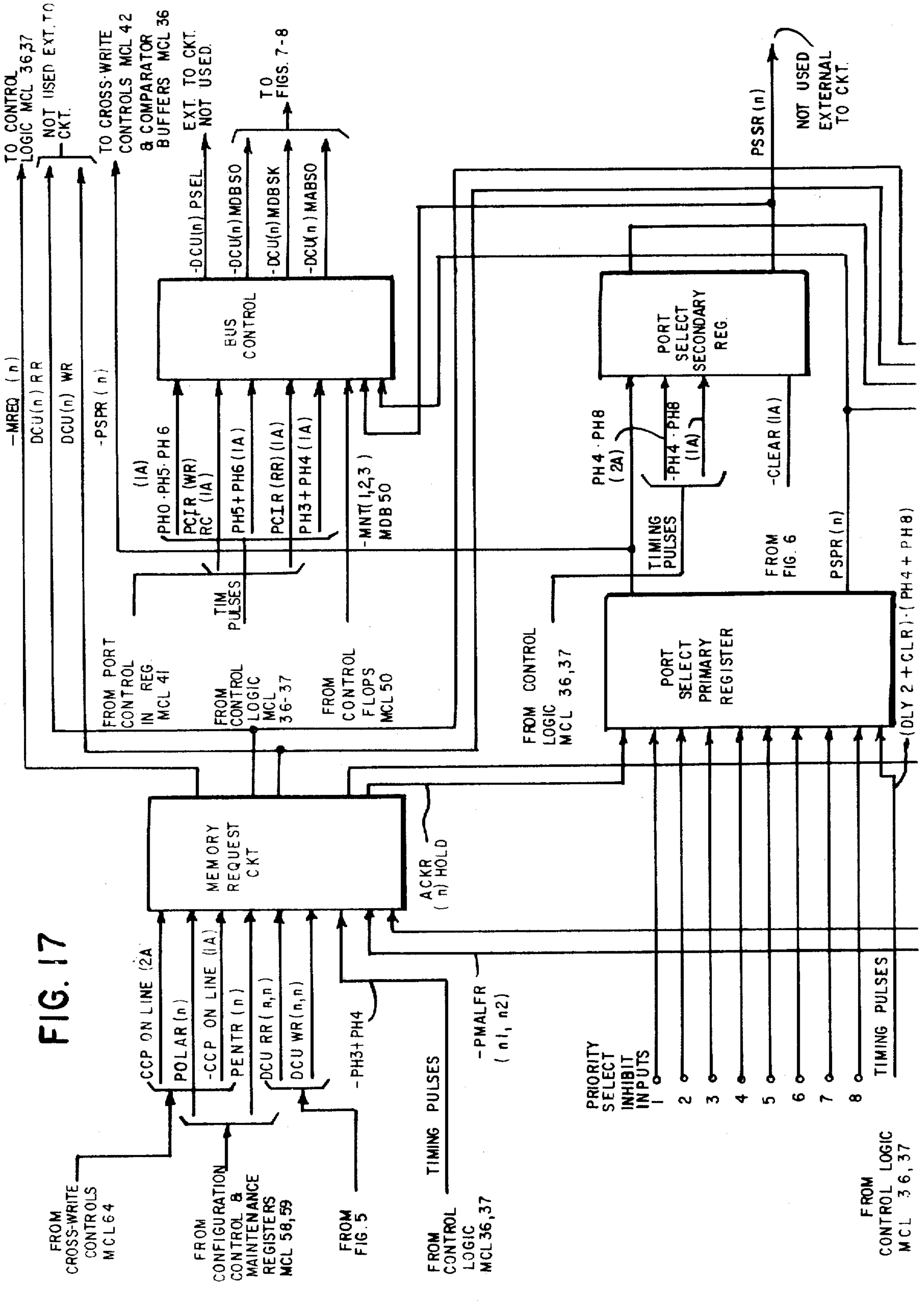
FIGS. 17 and 18 provide a block diagram for the port select circuit of the computer control.
Figure 18:
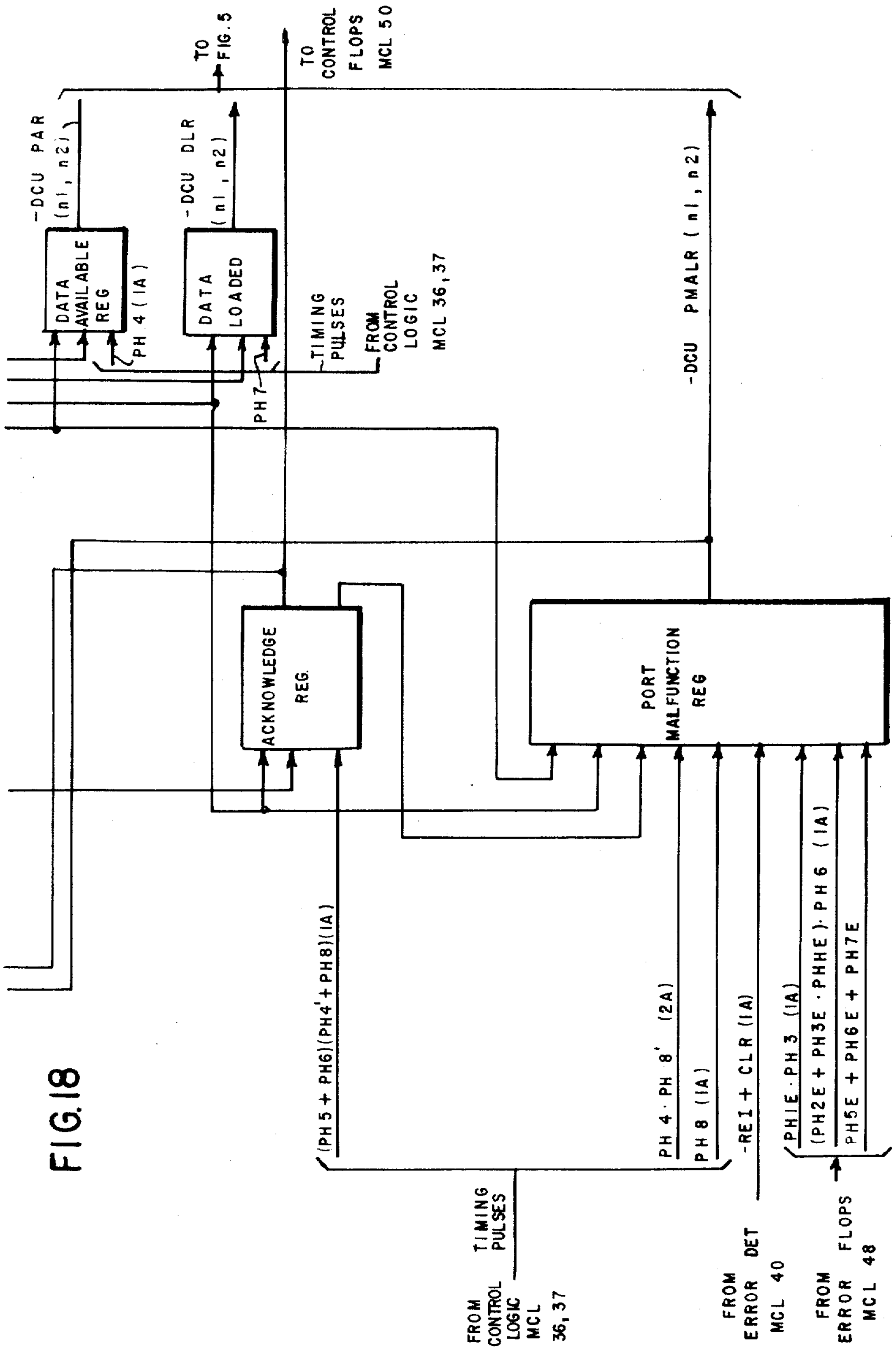

Referring to FIGS. 17 and 18, which show the port select circuit for one of the ports (1–7), each port select circuit further includes a memory request circuit MREQ, a port select secondary register PSSR, an acknowledge register ACKR, a data available register DAR, a data loaded register DLR and a port malfunction register PMALFR.

Figure 21:
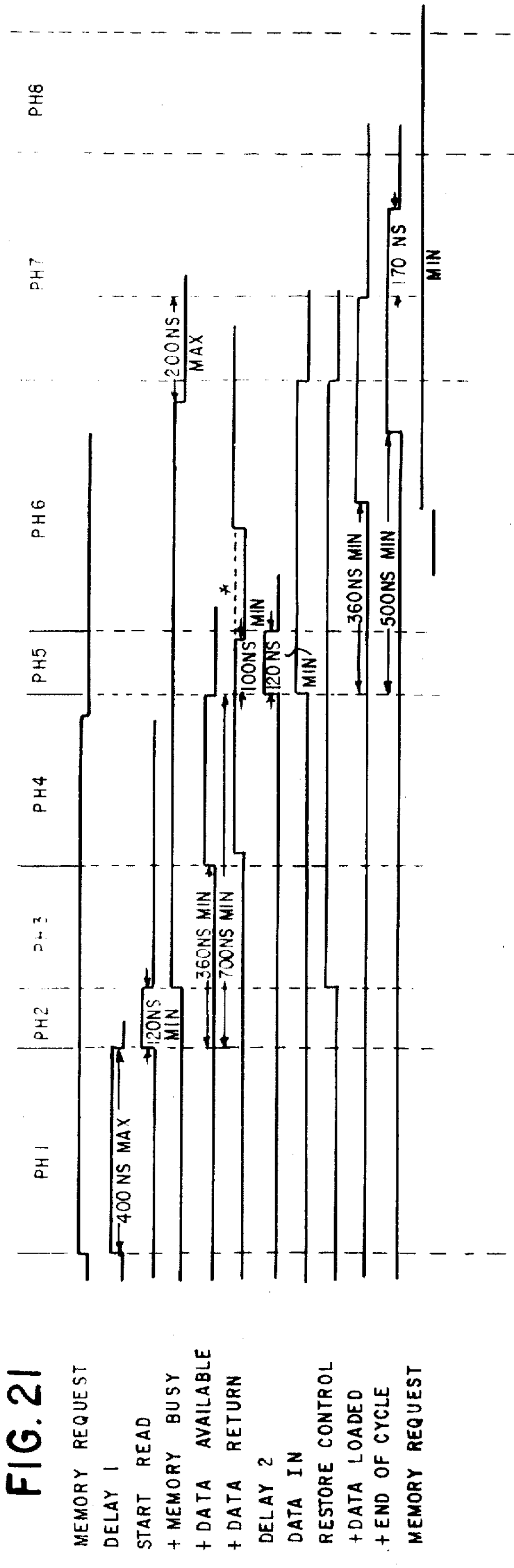
FIGS. 21 and 22 are timing diagrams for the memory cycles of the duplexed computer memory control.

The control input CI supplied to the memory control unit CMC-A by a port requesting access to the memory CMM-A is extended to the corresponding memory request circuit MREQ which generates a signal memory request, shown in line A of FIG. 21, in accordance with equations (94–97). The memory request is ANDED with memory requests provided by other port select circuits, if any, in accordance with equations (144–152) and the port select primary register PSPR of the selected port will be loaded.

At such time a signal DLY1 shown in line 3 of FIG. 21, (eq. 41) is generated by the memory control logic CL (FIG. 13) and phase Phl (eq. 122) becomes true.

When the computer memory controls CMC-A and CMC-B are running in sync, the port selections of the two memory controls CMC-A, CMC-B must agree before a port can be selected. When a memory request appears, the signal DLY1 provides a 350 nanosecond delay to allow port selection, bus propagation and memory bank selection to take place. At the end of DLY1, a comparison of the registers PSPR(1-7) of both memory controls CMC-A, CMC-B is made to see if the port selections agree. If another memory request was being answered when the memory request appeared, DLY1 does not start until 150 nanoseconds after the fall of the signal DATA AVAILABLE from the prior request.

If two ports have presented read requests at the same time it would be possible for the two memory controls CMC-A, CMC-B to select different ports. If, at the end of delay DLY1, the port selections do not agree, a second delay DLY3 of 150 nanoseconds is started and at the end of the DLY3 a retry at port selection is made. DLY3 resets DLY1 and allows the monopulser to recover, clears the port select primary registers PSPR in both memory controls CMC-A and CMC-B and after a 150 ns delay, a second try at port selection is made.

The port select primary registers PSPR for the computer memory control units CMC-A and CMC-B are compared by the port select primary register comparator PSPRC shown in FIG. 6, and if the registers compare a signal-PSPR CMP is generated. If on the other hand, the port select primary registers PSPR of the two computer memory controls CMC-A and CMC-B fail to compare, a signal PSPRC Is generated which is extended to the retry counter RTYC (eq. 164) shown in FIG. 3 which sets the first bit of the retry counter RTYC true (eq. 163–165).

Thereafter, the port select primary registers PSPR for both of the computer memory controls CMC-A and CMC-B are reset, and a second try at port selection is initiated. After three unsuccessful tries for port selection, the retry counter RTYC generates an output retry error RTRYES causing any write operations to be aborted to a read operation. However, the computer memory controls CMC-A and CMC-B answer the requests that were recognized on the last retry and select such ports.

When port select is accomplished, the address provided at the selected port, port 7 in the present example, is extended over the address bus multiplex 305, FIG. 3, to the address bus MAB. In addition, the control inputs are extended over port control input multiplexer 307 to the port control input bus PCIB.

Referring to FIG. 10, the address gated to the address bus MAB over the selected port is extended over a bus 1001 to a strapping board 1002 to enable bank selection and address checks. The strapping board 1002 provides hard wired connections between the address bus 1001 and a bank selection register 1003. The bank select circuit 1003 (eq. 15–18) in turn provides a control signal to control latches CF shown in FIG. 16 to enable the computer main memory CMM to access the addressed data location.

The outputs of the strapping board 1002 are also extended to an address out of range circuit 1004 which determines whether the received address is within the possible storage locations provided by the computer main memory CMM. In the event that the address is out of range, a command AOR (eq. 8) sets an error flop AOREF (eq. 9) via control flop AORF (eq. 10) of the memory control logic MCL (FIG. 10).

The output of the strapping board 1002 is also extended to a switch protected read only memory detector 1005, to a drum in its initialization table detector 1006 and to a drum outside block transfer area detector 1007.

Switch Protect Read Only Memory Check

Inputs to the switch protected read only memory detector 1005 (FIG. 10) are strapped to provide an output whenever an address received is within the address locations allocated to the switch-protected read only memory locations in the computer main memory CMM, which may be locations 0 to 512 or 1024. Inputs to detector 1005 are STRAP AO, which may be address bit $\overline{10}$ and $\overline{\text{ADD BUS (10–16)}}$. Address bits 10–16 of the seventeen bit address are ANDED and whenever any of such bits are true, the address lies within the switch protected area. If the received address is within one of these locations, the switch protect read only memory circuit 1005 provides an output ROM which is extended to a control flop ROMF of control flops CF of the computer memory logic MCL (FIG. 16).

Initialization Table Address Check

If the selected port (1–7) is connected to one of the drum control units DCU(1–6) the addresses are checked by ANDING bits on address bits 7–16 and the output of the register PSPR(1–6) in accordance with equation (36) to determine if the address is within the address locations allocated to the initialization table for such drum control unit. In equation (36), Straps AN, AM may connect to address bit 8, strap AL may connect to address bit 7, and straps G, K, L, M, N, O, P, Q to address bits 9, 10, $\overline{11}$, 12, 13, 14, $\overline{15}$ and $\overline{16}$, respectively.

The drum in its initialization table detector 1006 checks the maximum and minimum limits of the initialization table addresses for such drum control unit and if the address is outside of the initialization table an output DIIIT is generated and extended to a control flop DIIITF of the control flops CF of memory control logic MCL.

Furthermore, the address is checked to determine that a drum control unit is addressing the nonresident or block transfer locations by ANDING address bits 10–13 and the register PSPR(1–6) via drum outside block transfer area detector 1007 which generates an output DOBPTA (eq. 47) whenever the address is in error. The output DOBTA is extended to a flop DOBTAF (eq. 48) of the control flops CF of the memory control logic MCL-A.

Address bits (14–17) of the received address are also extended from address bus MAB to an address storage register PAI (14–17) which stores the bits (14–17).

Phase PH2 — Start Read or Start Write

Figure 22:
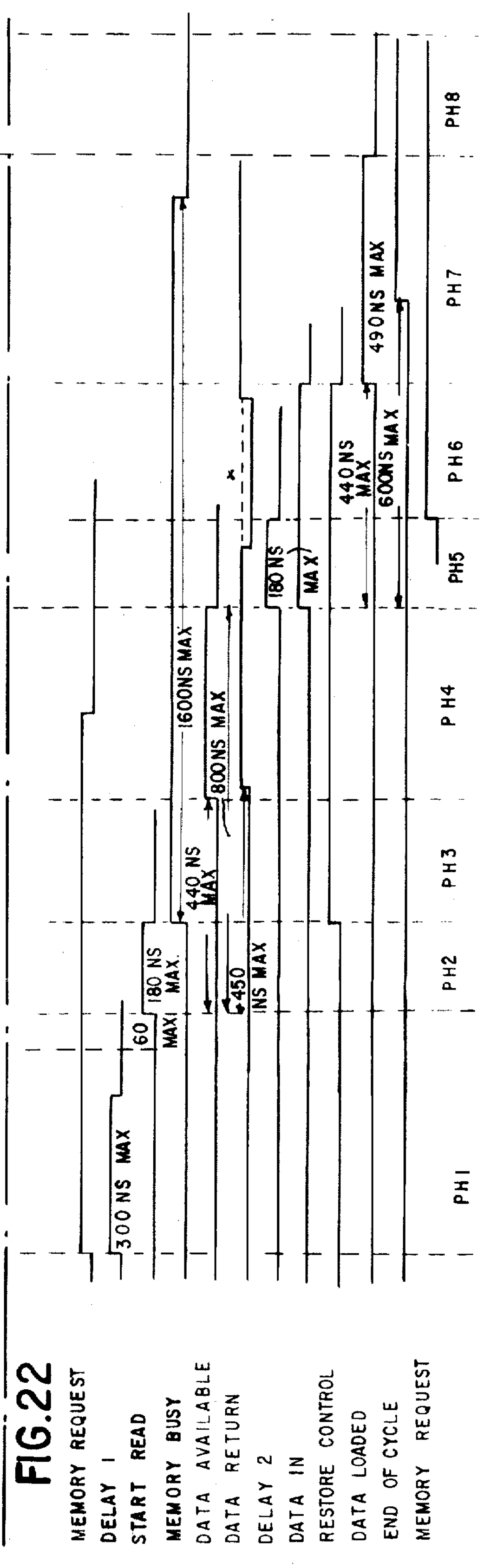

If the two computer memory controls CMC-A and CMC-B are running in synchronism and the port select primary registers PSPR compare, or after three retries have been made and the signal MEMORY BUSY from the main memory CMM has been reset, phase PH2 is entered when signal DLY1 has ended in both memory controls CMC-A, CMC-B as shown in lines B of FIGS. 21 and 22. If at the end of signal DLY2, the computer memory controls CMC-A, CMC-B do not compare, a synchronism time out flip-flop SYNCTOF (eq. 169) is set, providing an error indication for central processor CCP-A.

When phase PH2 is entered (eq. 123), a 120 ns signal START READ (FIG. 21, line C) is sent to the selected computer main memory CMM bank. The signal START READ (equation 167) is generated by the memory bank select MBS shown in FIG. 14. With the receipt of the signal START READ, the memory clock circuit (not shown) of the memory CMM generates a signal MEMORY BUSY (eq. 85), FIG. 21, line D, which is returned to the computer memory control CMC-A over the memory control bus multiplex MCM shown in FIG. 8.

During phase PH2 the following conditions are checked and corresponding control flops are set if errors are indicated:

| | |
|---|---|
| Address out of range | AOREF (eq. 9) |
| Address in read only memory | ROMF (eq. 161) |
| Three port select retries were made and port select primary registers still do not agree | RTRY3F (eq. 165) |
| Drum in its initialization table | DIITF (eq. 37) |
| Drum outside block transfer area | DOBTAF (eq. 48) |

In addition, during phase PH2, bits 14–17 of the address are gated into registers PAI(14–17).

Phase PH3 — Data Access

When the signal MEMORY BUSY is generated by the computer main memory CMM-A, the computer memory control unit CMC-A enters phase PH3 (eq. 124). During phase PH3, the port control IN register PCIR (FIG. 15) is loaded with the control inputs -PCIR(RR), -PCIR(WR), -PCIR(PT) and -PCIR(INIT) which appear on the port control IN bus PCIB, and the bank select register BSR is loaded. The data loaded into the port control IN register PCIR indicates the operation to be performed which may be a read request PCIR(RR), a write request PCIR(WR) privileged transfer status PCIR(PT), or drum initialization table lookup PCIR(INIT). These inputs PCIB (WR), PCIB (RR), PCIB (PT) and PCIB (INIT) are supplied to the register PCIR over the port control IN bus PCIB from the port control in multiplex circuit shown in FIG. 12.

The main memory bank MB(1–4)A selected is connected to the memory data bus MDB as a source (MM(n)MDBSO) equation (89) and for a read request the port selected is connected as a sync (DCU(n)MDBSK) equation (32).

The memory data bus source enable MDBSO is received by the memory data bus multiplexer 305 from the memory control logic as indicated in FIG. 12. The data word at the addressed location is read into a computer main memory register (not shown) and is gated onto the data bus MDB. In addition, a data bus sync enable, also shown in FIG. 12, enables the data supplied over the selected port to be gated to the data bus MDB during the write portion of the memory cycle (phase PH6).

During phase PH3, the following conditions cause corresponding control flops to be set:

| | |
|---|---|
| Port address and compare | PAICF (eq. 99) |
| Port address in even parity | PAIEPF (eq. 100) |

The addresses stored in registers PAI(14–17) of the two memory controls CMC-A, CMC-B are compared. In the event that both computer memory control CMC-A and CMC-B do not indicate the same address error PAICF is indicated.

The port address in even parity check PAIEPF Is also during phase PH3 to determine if the addresses in both computer memory control units CMC-A and CMC-B are in parity.

The port malfunction indication register PMALFR, shown in FIG. 18, is also set via the error flop EF shown in FIG. 16 if appropriate errors are detected. For example, if synchronism timeout (memory busy signals out of sync for the two memory control units CMC-A and CMC-B) SYNCTOF (eq. 169) has occurred or in the event of a retry failure RTRY3F (eq. 165) occurred. Thus, when an error is detected in the information received from the selected port, of the two controls CMC-A, CMC-B, the port malfunction register PMALFR, which is a hardware disable, resets the port select primary register PSPR for such port and provides an error indication to the central processor CCP-A.

A drum table error DTEF (eq. 49) is recognized during phase PH3 if a drum control unit DCU attempts to access a location outside of its initialization table during an initialization sequence PCIB(INIT), control unit or if the drum DCU attempts to write outside of its initialization table and the block transfer area when it is not a privileged transfer PCIB(PT).

Phase PH4 — Memory Output Comparison and Checks

When the data at the addressed location of the computer main memory CMM-A has been loaded into the memory registers, the memory clock returns a signal DATA AVAILABLE (eq. 29) shown in FIG. 21 at line E, such signal being returned over the memory control return bus MCB shown in FIG. 8. Phase PH4 (eq. 125) is entered when the signal DATA AVAILABLE Is provided by the main memory CMM. When the computer memory control CMC-A is not in Phase PH8 from the previous memory cycle, the port select secondary register PSSR shown in FIG. 17 is loaded during Phase PH4 from the port select primary register PSPR to hold the connection to the selected port during the balance of the memory cycle. The register PSSR will be reset during phase PH4 of the next memory cycle, thereby inhibiting enabling of the associated register PSPR for the next memory cycle. Also the data available register DAR (FIG. 17) is loaded which returns the DATA AVAILABLE signal to the selected port.

If Phase PH8 from the previous memory cycle has ended and a port has not removed its memory request from the previous memory cycle, that port's malfunction register PMALFR (eq. 135), the port request time out error flop PTOEF (eq. 154), and the error stored flop ESF (eq. 54) is set.

During phase PH4 the data stored in the data register of the main memory CMM-A is gated to the data bus MDB via the data bus multiplex circuit 302 (MDBSK). The parity of the word read from the computer main memory CMM-A is checked MDRREPF (eq. 76–77) and when both computer memory control CMC-A and CMC-B are in phase PH4, a comparison is made of the data read from the main memories MDRRCF (eq.

74–75). A signal DATA RETURNED from the main memory CMM-A to the data bus MDB is shown in FIG. 21 at line F. The simplex circuit, shown in FIG. 4, includes a comparator data bus CDB which extends the data buses MDB from memory control CMC-A and CMC-B to a data bus compare circuit DBCC. In the event that the data words read from the computer main memory CMM-A, CMM-B at the addressed locations do not compare, an error indication is generated via the error flops EF of the memory control logic MCL-A (FIG. 16).

Also during phase PH4, data bit 25, which is the memory protect bit, is loaded into a flip-flop MDB25 (eq. 67) to record the memory protect status of the word readout from the addressed location of the main memory CMM-A. If a port making a request which is not a privileged transfer PCIB(PT), equation (105) attempts to write into a protected word location when the memory protect bit flop MDB25 is set, a protected word error PCROMERR (equation 112) is provided. The memory protect data bit flop MDB25 is shown in FIG. 12. The error indication PCROMERR causes setting of an error flop of the memory control logic MCL shown in FIG. 16.

If no errors were discovered during the previous memory cycle, so that the disable error register load flop (DERLF), equation (35) is not set, and any of the following errors were detected in the present memory cycle, the following bits in the error register (FIG. 16) are set during phase PH4:

| | |
|---|---|
| Port address in comparison error | PAICEF (eq. 98) |
| Bank select register comparison error | BSRCEF (eq. 13) |
| Port address in parity error | PAIPEF (eq. 101) |
| Address out of range | AOREF (eq. 9) |
| Read only memory error | ROMEF (eq. 160) |
| Drum table error | DTEF (eq. 49) |
| Port invalid control in error | PINVCIEF (eq. 49) |
| Retry error | RTRYEF (eq. 131) |
| Memory control read only memory error flop | PC ROMEF (eq. 111) |
| Synchronism time-out error (data available signals out of sync) | SYNCTOF (eq. 169) |

The following errors listed with the times they are detected cause a write cycle to be aborted and the word read out of main memory CMM to be written back into the memory CMM.

| | |
|---|---|
| Port invalid control in | PINVCIR PH1 |
| Port address in comparison error | PAICEF PH3 |
| Port address in even parity | PAIPF PH3 |
| Address out of range | AORF PH2 |
| Retry failure | RTRY3F PH2 |
| Write request for read only memory | ROM PCIR(WR) PH2 |
| Drum table error | PH3 |
| Bank selection comparison error minus | BSRCOMP PH1 |
| Protected word error | PWERR PH4 |

In addition, if any of the above listed errors are generated, a signal RESTORE CONTROL (eq. 158) is generated by the memory control logic MCL-A via the control logic circuits CL thereof. The signal RESTORE CONTROL (FIG. 21, line G) is extended to the computer main memory CMM-A to abort a writing cycle and to effect the writing of the data word read out back into the addressed location of the memory CMM-A.

The signal RESTORE CONTROL can be generated any time after phase PH3 in response to one of the above errors. The signal RESTORE CONTROL is generated for every read command.

PH5 — Preparation for Next Memory Cycle

At the end of the signal DATA AVAILABLE, FIG. 21, line E, a signal DELAY 2, DLY2, shown in line G of FIG. 21 is generated. The signal DLY2 effects the setting of the acknowledge register ACKR, FIG. 18, which in turn effects resetting of all of the port select primary registers PSPR(1–7) via the memory request circuit MRC shown in FIG. 17.

During phases PH5 and PH6, the port control IN bus PCIB is not connected to any port. The memory address bus MAB is connected to the selected memory bank CMM-A as a source as determined by the bank select register BSR. For a write request, the port held by the port select secondary register PSSR is connected to the memory data bus MDB as a source. In a write cycle, a comparison of the input data DATA IN from a port is made until one of the memory controls CMC-A, CMC-B enters phase PH7 (MDICF), equations (68–69). In addition, during a read cycle, the parity of the data word returned from the computer main memory CMM-A to the data bus MDB is checked for parity. Also, the data IN from the selected port is checked for parity MDIEPF (eq. 70).

Moreover, during phase PH5, the parity of the address returned from the main memory CMM is checked against the memory address received from the selected port which is stored in registers PAI(14–17) MAREPF (eq. 62).

If the disable error register load flop DERLF has not been set by an error in the previous memory cycle, and any of the following errors occur in the present memory cycle, the port select malfunction register PMALFR, the bank select malfunction register BSMR, and port control IN malfunction register PCIMR are loaded.

The following bits in the error register are loaded during phases PH5 and PH6:

| | |
|---|---|
| Memory data return read compare error | MCRRCEF (eq. 73) |
| Memory data return read parity error | MCRRPEF (eq. 78) |
| Protected word error | PWEF |

The retry register is reset during phase PH5. At the end of phase PH5, the status of bus PCIB is changed, and the port input control bus PCIB is disconnected from the selected port.

When the acknowledge flip-flop ACKR is set, the associated port select primary register PSPR is inhibited, thereby locking out such port as a memory request source in the next memory cycle. This prevents hogging of the memory control CMC-A and memory access by one of the ports.

PH6 -- Write into Main Memory and "Cycle Stealing"

At the end of phase PH5, which is defined by the termination of signal DLY2, the computer memory control CMC-A enters phase PH6 (eq. 127). If a memory request is present at a port, the memory control CMC-A will enter phases PH1 and PH6 simultaneously, in accordance with the "cycle stealing" feature. The port whose memory request will be served next will be selected in the manner described above while the word provided by the port being serviced will be written into the memory bank (1–4)A during the present cycle. The port being served in the present cycle, if it is a write request, is gated to the data memory bus MDB as a source. Main memory locations selected by the bank select register BSR will gate data from the bus MDB by internally generated timing at such time a signal DATA LOADED, FIG. 21, line J, will be provided by the memory clock. Also, a signal END OF CYCLE, FIG. 21, line K, will be provided by the memory clock approximately 150 ns after the signal DATA LOADED is provided.

If a second memory request is to a different memory bank, the second memory cycle is started before the first memory cycle is finished. In this special case, data through-put of the control CMC is not limited by the memory CMM, but by the amount of memory cycle overlapping allowed by the control CMC.

At the end of phase PH6, if another port has been selected in the port select primary register PSPR entering the next cycle at phase PH1, the port control IN bus PCIB and memory address bus MAB will be connected to that port as a source for the next memory cycle in a manner described above. If on the other hand, no memory requests are present, the processor CCP-A is selected as the input port and the idle phase PHO is entered.

PH7 — Load Data Loaded Register

When the signal DATA LOADED (FIG. 21, line H), is returned to both computer memory control units CMC-A and CMC-B over the memory interface circuit MIC, phase PH7 (eq. 128) is entered. As indicated in FIGS. 21H and 22H the signal DATA LOADED (eq. 30) must be returned to both memory controls CMC-A and CMC-B before phase be returned to both memory controls CMC-A and CMC-B before phase PH7 is entered. During phase PH7, for a read request, the data stored in the memory register is written back into the computer main memory CMM-A at the addressed location. For a write request, the data on the memory data bus MDB provided over the selected port is written into the computer main memory CMM-A. Also, the data loaded register DAR (FIG. 18) is loaded and indication will be returned to the selected port during phase PH7.

During phase PH7 the following checks are made:

| | |
|---|---|
| Memory data return write even parity | MDRWEPF (eq. 82–83) |
| Memory data return write compare | MDRWCF (eq. 80–81) |

If no error was discovered in the previous cycle so that the disable error register load flop DERLF Is not set, and any of the following errors exist, the error registers EF loaded during phase PH7 are:

| | |
|---|---|
| Memory address return comparison error | MARCEF (eq. 58) |
| Port data IN comparison (write request cycle only) | PDICEF (eq. 113) |
| Memory data return write comparison error | MDRWCEF (eq. 74) |
| Port data in parity error (write request only) | PDIPEF (eq. 114) |
| Memory data return write parity error | MDRWPEF (eq. 84) |

In the event of an aborted write cycle as for example indicated by the presence of the signal RESTORE CONTROL, the data available on the memory data bus MDB Is not to be loaded into the memory register and the data word which has been read out of the data register from the addressed location is written back into the computer main memory CMM at such location.

The memory data bus MDB is held by the port being serviced during phase PH7 to make the parity and comparison checks. For a write request, the data loaded register DLR of the port selected in the port select secondary register PSSR is loaded during phase PH7. The bank select register BSR cannot be changed until the end of phase PH7. However, at the end of phase PH7, the register BSR can be loaded with the address supplied by the next port to be serviced.

The memory data bus MDB is also a source for the memory data bus. This provision allows data from memory CMM to be stored on the bus MDB and extended to the selected port up to phase PH3 of the next memory cycle.

Phase PH8 — End of Cycle

When the signal END OF CYCLE (FIG. 21, line K) terminates in both memory controls CMC-A and CMC-B, and the DATA LOADED signal is removed from both memory controls CMC-A and CMC-B. If an error was discovered during phases PH5, PH6 or PH7, the port malfunction register PMALFT (eq. 132–135) is set during phase PH8. A synchronism time out, SYNCTOF, equation 169, or memory invalid control return MINVCREF, equation 87, error sets the error stored flop ESF equation 54) at any time. If a port time out error PTOEF (eq. 154) occurs, the flop ESF is set during phase PH4. For other errors, the flop ESF is set during phase PH8. If the flop ESF is set, the disable error load flop DERLF Is set during phase PH8. This will prevent the error register EF from being disturbed unitl reset error indicators REI or clear CLR is received from the central process or CCP-A.

If a comparison error is discovered during phase PH4 or PH7, a signal COMPARE ERROR (eq. 23) is extended to the central processor CCP-A when the flop ES is set during phase PH8. When the signal END OF CYCLE is removed from both controls CMC-A and CMC-B, the controls CMC-A and CMC-B enter phase PHO, if there are no other memory requests.

Asynchronous Control

The memory control logic MCL of the control CMC does not contain a clock or any other form of internal timing circuit, with the exception of three internal delay circuits DLY1, DLY2, and DLY3. Memory control CMC timing is determined by external subsystems, specifically the units DCU, processor CCP, and memory CMM.

Assuming the control CMC is idle, an incoming request is handled immediately (less gate delays) rather than waiting for a preassigned time slot, as in a "synchronous control" arrangement.

Data through-out of the control CMC is limited by the memory bank accessed, rather than by an internal clock. If a memory bank is slow, through-put is low, and if it is fast, through-put is high. Both fast and slow memory banks are operated at their maximum speed providing optimum performance.

Maintenance of the control CMC is simplified. The control CMC can be stepped through each timing phase PH1–PH8 by simulating inputs to the control CMC at any time rate consistent with diagnosis. Special provisions are made for only the internal delay circuits DLY1, DLY2, and DLY3.

Referring to FIGS. 21 and 22, lines, A, B, E. I, and J, the signals for the two memory controls CMC-A and CMC-B which are checked for synchronism time out, with the times at which they are supposed to occur are:

| | |
|---|---|
| Delay 1 flop and MEMORY BUSY | Phase PH2 |
| RESTORE CONTROL (RC) | Phase PH1–PH4 |
| DATA AVAILABLE (DA) | Phase PH4 |
| DATA LOADED (DL) | Phase PH7 |
| END OF CYCLE | Phase PH7 |

As can be seen by comparing like signals for memory controls CMC-A and CMC-B (FIGS. 21 and 22, respectively), the time at which the various signals appear or terminate may vary within predetermined time maximum and minimum limits. However, if the corresponding signals are not generated within such times, a synchronism time out occurs.

Referring to FIG. 3, the memory invalid control return is connected to the output of the memory control return bus MCB and monitors the four control signals, MEMORY BUSY, DATA AVAILABLE, DATA LOADED and END OF CYCLE, and if any of these signals fail to appear in the proper sequence, an error indication MINVCREF (equation 87) is provided.

Drum Control Memory Access

Whenever the central processor CCP-A requires information, such as a diagnostic program stored in the auxiliary memory or drum memory system, the central processor CCP-A accesses the computer main memory CMM-A via the memory control CMC-A. The central processor CCP-A supplies an address for the initialization table data storage locations in the computer main memory CMM-A which corresponds to the drum control unit DCU which stores the information required by the central processor CCP-A. The central processor CCP-A effects the writing of instructions into the initialization table of the designated drum control unit DCU. Such instructions may include the particular information to be retrieved, and the location in the computer main memory CMM-A where such information is to be stored.

Once the instructions have been stored in the initialization table for the designated drum control unit DCU, the central processor CCP-A supplies a control pulse directive directly to the drum control unit DCU via a control pulse directive decoder shown in FIG. 15. The control pulse directive CPD is extended to the designated drum control unit DCU via the interface cable, enabling the drum control unit DCU to provide a memory request to the memory control CMC-A. The control pulse directive CPD provided to the central processor CCP-A may also indicate whether the drum control unit DCU is privileged to write in areas other than its own initialization table or the block transfer area of the computer main memory CMM-A.

Accordingly, when the port to which the designated drum control unit DCU is connected is selected by the memory control CMC-A for a memory cycle, input signals supplied over the control inputs to the port control in register PCIR include a read request PCIB (RR), an indication that the drum control unit is accessing its initialization table PCIB(INIT) and a privileged transfer status indication, if provided, PCIB(PT).

The drum control unit DCU accesses its initialization table and effects readout of the instructions stored therein by the central processor CCP-A. The instructions read out from the initialization table are returned to the designated drum control unit DCU which responsively effects readout of the desired or indicated instructions. The drum control unit DCU then provides a memory request for the computer main memory CMM-A and causes the instructions at the indicated locations of the drum to be transferred to the indicated locations of the computer main memory CMM-A via the memory control CMC-A.

During the time that the drum control unit DCU is transferring instructions required by the central processor CCP-A, the central processor CCP-A is free to continue its call processing or other maintenance operations, the transfer of data from the drum to the computer main memory CMM being effected, once initiated by the central processor CCP-A, by the memory control CMC-A.

When the desired instructions have been transferred to the computer main memory CCM-A, the drum control unit DCU provides a control pulse directive back to the control processor CCP-A to indicate that the information is stored in the computer main memory CMM-A.

Cross Write

A maintenance feature is incorporated into the memory control CMC which enables an on line processor CCP to refresh an off line core main memory CMM directly from the one line copy of main memory. Once the memory control CMC is in the Cross Write Active configuration one processor CCP-A, for example, may independently refresh all locations in main memory CMM by merely repeating a two instruction loop; LOAD A, STORE A. Note that all memory protection features remain in effect in the on-line CMC during a cross write operation. During cross write Program Controlled Read Only Memory protection is disabled in the off-line control CMC. Thus the on line processor CCP writes over 25th bit protected words in the off line memory.

Cross Write may only be employed by an on-line processor CCP and the memory (CMM-A, or CMM-B) being refreshed must have its associated CCP off line. If both processors CCP-A, CCP-B become either on line or the configuration is reversed by the Third Party, Cross Write Configuration is immediately lost and must be entirely reinitiated. If both processors CCP-A, CCP-B become off-line Cross Write remains Active.

During Cross Write, the drum control units DCU(1–6) may be active when Cross Write is initiated and during cross write. Since the drum control units DCU (1-6) can access the on line, main memory it is necessary to also allow them access to the off-line memory. This insures that the off-line memory is updated by any drum control unit DCU to main memory transfer which occurs during a cross write.

The duplex memory controls CMC are configured to Cross Write Active state by means of master-slave storage elements. The master is loaded at the time the online CCP issues the SET CROSS WRITE CPD.

The slave is not set until both memory controls CMC become idle. Note that setting CROSS WRITE ACTIVE requires a re-synchronization of the memory control CMC. If three drum control units DCU request access to the on line main memory at the time processor CCP tries to set Cross Write a worst case maximum of 7.0 usec. could elapse between the SET CROSS WRITE CPD and the achievement of Cross Write Active configuration. A sense line is provide indicating CROSS WRITE ACTIVE.

Once Cross Write Active configuration is achieved the on line processor CCP is enabled by a Cross Write Active Flop to access the off line CMC through the Port 8 (Port 8 is connected to Port 7 of the duplex CMC unit via backplane wiring). In the off line CMC Port 7 is blocked to insure that the off line CCP can not interfere with actions of the on line CCP. CPD instructions from the off line CCP are allowed access to the off line CMC during Cross Write. To insure that both memory controls CMC will be available for transfers during Cross Write Active the memory controls CMC are run in synchronism. Because they are in sync the following comparisons ar made:

i. Port Address in
ii. Port Data in
iii. Memory Address returned
iv. Synchronism Time Out
v. Bank selection Comparison
vi. Port Selection Retry Error The memory data returned is not compared as it is not expected to compare during Cross Write. The above mismatches are available in sense lines for interrogation. The CMC MISMATCH signal however is DISABLED during cross write as this signal is used to generate a THIRD PARTY trap.

Data and control signals are returned to the processor CCP from the on-line main memory (via memory control CMC) only during CROSS WRITE. The signal DATA LOADED is returned to the on-line processor CCP by the on-line memory control CMC only after DL is returned to the CMC by BOTH memories. Control signals are returned to the drum control units DCU (1–6) from both memory control CMC but DATA is returned to the drum control units DCU(1–6) only from the on-line memory control CMC.

All error detection circuitry in both memory control CMC with the exception of Memory DATA (READ and WRITE) RETURNED COMPARISON ERROR remains active during CROSS WRITE.

Two means of exit (other than system master CLEAR) from cross write are available:

1. execution of RESET CROSS WRITE CPD. In this case the same sequence of events occurs as does when entering cross write. The CROSS WRITE ACTIVE (SLAVE) latch is not reset until both memory controls CMC are idle. When Cross Write Active flop becomes reset the drum control units DCU(1–6) will not have access to the off line CMC unless their associated port enable test registers PENTR are set.

2. Bring the off-line processor CCP back on line. This causes immediate resetting of Cross Write Active Flop. The DCU's will now be enabled to both CMC's by the CCP ON LINE signal if their associated port on line registers POLR are set.

In summary the steps required to enter CROSS WRITE ACTIVE configuration are:

1. One processor CCP must be on-line, one processor CCP must be off-line.

2. The Port On Line Register (POLR 1–6) of the off-line CMC must be equal to the POLR of the on-line CMC.

3. Issue SET CROSS WRITE CPD to the on-line CMC by execution of the associated CPD instruction in the on-line CCP.

4. Sense for CROSS WRITE ACTIVE sense line true.

5. When CROSS WRITE ACTIVE sense line is true begin reading the on-line core main memory and writing both memories with the STA, STQ, etc. instruction executed in the on-line CCP only. To exit from Cross Write 1. System Clear in the off-line processor CCP. Subsequently drum control unit DCU transfers will not effect the off-line CMM.

2. Issue Reset Cross Write CPD and sense for Cross Write Active sense line false. Drum control unit DCU transfers will now be lost unless the Port Enable Test Register (PENTR 1–6) in the off-line CMC is equal to the POLR of the on-line CMC.

3. Bring the off-line processor CCP back on-line. No drum control unit DCU transfers will be lost as long as the POLR in the off-line CMC has been left set.

What is claimed is:

1. In communication switcing system including switching network means and a data processing unit for controlling apparatus to effect connections over said switching network means, a memory control arrangement in said data processing unit including central processor means, main memory means having a plurality of addressable data storage locations for storing data words for use by said central processor means, each data word having a plurality of data bits and at least one memory protect bit, auxiliary memory means for storing further data words for use by said central processor means, and computer memory control means for permitting access to said main memory means by said auxiliary memory means or said central processor means, said computer memory control means having a plurality of input/output ports including a separate port for each of said auxiliary memory means and said central processor means for enabling said auxiliary memory means and said central processor means to address data storage locations of said main memory means over the associated port to permit modification or readout of a data word stored at an addressed location of said main memory means, port select means for selecting one of said ports in response to memory access data, including the address of a data storage location of said main memory means, supplied to said one port by the auxiliary memory means or the central processor means associated therewith, said port select means being operable to extend the address supplied over the selected port to said main memory means to effect the read out of the data word at the addressed location, first means enabled when the data word stored at the addressed location of said main memory means is read out for determining if the memory protect bit of the data word read out is in a first state indicating that the data word is protected, and second means controlled by said first means for normally preventing the central processor means from writing into said addressed location whenever the memory protect bit of the data word read out is in said first state.

2. A system as set forth in claim 1 wherein said port select means includes control means for normally inhibiting said seocnd means whenever the port associated with said auxiliary memory means is selected to permit said auxiliary memory means to write into a data storage location storing a protected data word, said control means enabling said second means whenever the port associated with said central processor means is selected to prevent said central processor means from writing into a data storage location storing a protected data word.

3. A system as set forth in claim 1 wherein said first means comprises a first status register means operable to provide a first output whenever the memory protect bit of the data word read out is in said first state and a second output whenever the memory protect bit of the data word read out is in a second state.

4. A system as set forth in claim 3 wherein said second means includes second status register means and inhibit means, said second status register means normally providing a first output for enabling said inhibit means to be responsive to said first output of said first status register means to prevent said central processor means form writing into a data storage location storing a protected data word, said second status register means being controllable to provide a second output to disable said inhibit means to thereby permit said central processor means to write into a data storage location storing a protected data word.

5. A system as set forth in claim 4 wherein said second status register means comprises a flip flop settable to first and second states to provide said first and second outputs, respectively, and wherein said port select means includes means for extending a command provided by said central processor means to said flip flop for selecting the status of said flip flop.

6. In a communication switching system including switching network means and a data processing unit for controlling apparatus to effect connections over said switching network means, said data processing unit including a memory control arrangement including a main memory means having a plurality of addressable data storage locations for storing multibit data words, at least first and second subsystem, and memory control means for permitting access to said memory means by said first and second subsystems in response to memory access data, including an address of a data storage location of said main memory means, supplied to said memory control means by said first and second subsystems, said memory control means including first means responsive to memory access data supplied by one of said subsystems for identifying the subsystem supplying the memory access data, second means for sensing the condition of at least one bit of the data word stored at the addressed data storage location of said main memory means, and third means controlled by said first and second means for conditionally preventing said first subsystem from writing into said addressed data storage location while enabling said second subsystem to write into said address data storage location whenever said one bit is sensed to be in a first state indicating that the data word stored therein is protected.

7. A system as set forth in claim 6 wherein said third means include inhibit means operable when enabled for inhibiting a write operation, and status means including a status register means settable to one state for preventing said first subsystem from writing into a data storage location in which the data word is protected, and settable to a second state for permitting said first subsystem to write into a data storage location in which the data word is protected, said status means being controlled by said first means to enable said inhibit means to be controlled by said second means to prevent a write operation whenever said first subsystem supplies memory access data to said memory control means while said status register means is set to said one state.

8. In a communication switching system including switching network means and a data processing unit for controlling appratus to effect connections over said switching netowrk means, said data processing unit including a memory control arrangement including a main memory means having a plurality of addressable data storage location for storing multibit data words, at least first and second subsystems and memory control means for permitting access to said main memory means by said subsystems in response to memory access data, including the address of a data storage location provided by one of said subsystems, a method of providing conditional access of data storage locations of said main memory means by said first subsystem, said method comprising identifying the subsystem supplying the memory access data to said memory control means, sensing the condition of at least one bit of the data word stored at the addressed data storage location of said main memory means to determine if the data word is protected, determining the condition of a status register which is settable to one state whenever the first subsystem is to be prevented from writing into a data storage location in which the data word is protected and settable to a another state whenever said first subsystem is to be permitted to write into a data storage location in which the data word is protected, inhibiting a write operation whenever the first subsystem addresses a data storage location in which the data word is protected while the status register is set to said one state, and enabling a write operation whenever said second subsystem supplies memory access data or said first subsystem supplies memory access data while status register is set to said other state.

* * * * *